US008171193B2

(12) United States Patent
Yamada

(10) Patent No.: US 8,171,193 B2
(45) Date of Patent: May 1, 2012

(54) MASTER COMMUNICATION CIRCUIT, SLAVE COMMUNICATION CIRCUIT, AND DATA COMMUNICATING METHOD

(75) Inventor: Susumu Yamada, Gunma-ken (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 1435 days.

(21) Appl. No.: 11/692,062

(22) Filed: Mar. 27, 2007

(65) Prior Publication Data

US 2007/0230334 A1    Oct. 4, 2007

(30) Foreign Application Priority Data

Mar. 28, 2006   (JP) ................................ 2006-087881

(51) Int. Cl.
    *G06F 13/42* (2006.01)
(52) U.S. Cl. .................... 710/105; 710/106; 710/110
(58) Field of Classification Search .................. 710/106, 710/105, 110
    See application file for complete search history.

(56) References Cited

U.S. PATENT DOCUMENTS

| 4,587,651 | A | * | 5/1986 | Nelson et al. | 370/405 |
| 4,745,596 | A | * | 5/1988 | Sato | 370/447 |
| 5,052,029 | A | * | 9/1991 | James et al. | 375/356 |
| 5,704,030 | A | * | 12/1997 | Kanzaki | 714/12 |
| 2006/0273904 | A1 | * | 12/2006 | Funo et al. | 340/572.1 |

FOREIGN PATENT DOCUMENTS

| JP | 07-030613 | 1/1995 |
| JP | 2001-508562 | 6/2001 |
| WO | WO 97/33232 | 9/1997 |

\* cited by examiner

*Primary Examiner* — Mark Rinehart
*Assistant Examiner* — Nimesh G Patel
(74) *Attorney, Agent, or Firm* — SoCal IP Law Group LLP; Steven C. Sereboff; John E. Gunther

(57) ABSTRACT

A master communication circuit communicatively connected to a slave communication circuit, comprises a timer circuit that can detect a first time; a first output circuit that outputs a first output signal of one logical level for starting a detecting operation of the first time in the timer circuit, when a value transmitted to the slave communication circuit is one logical level, and for starting a detecting operation of a second time longer than the first time in the slave communication circuit; and a second output circuit that outputs a second output signal of the other logical level when the timer circuit detects the first time, wherein if a value of one logical level is transmitted to the slave communication circuit, the value of one logical level is transmitted to the slave communication circuit by not detecting the second time with the slave communication circuit, detecting the first time with the timer circuit, and outputting the second output signal with the second output circuit, and wherein if a value of the other logical level is transmitted to the slave communication circuit, the value of the other logical level is transmitted to the slave communication circuit by not detecting the first time with the timer circuit and detecting the second time with the slave communication circuit.

20 Claims, 10 Drawing Sheets

MASTER COMMUNICATION CIRCUIT, SLAVE COMMUNICATION CIRCUIT, AND DATA COMMUNICATING METHOD

CROSS REFERENCE TO RELATED APPLICATION

This application claims the benefit of priority to Japanese Patent Application No. 2006-87881, filed Mar. 28, 2006, of which full contents are incorporated herein by reference.

BACKGROUND OF THE INVENTION

1. Field of the Invention

The present invention relates to a master communication circuit, a slave communication circuit, and a data communicating method.

2. Description of the Related Art

When debugging an integrated circuit equipped with a microcomputer, debug data must be written into the integrated circuit to be debugged or data output by the microcomputer must be read out. Therefore, the integrated circuit needs an interface for inputting and outputting data as above.

By the way, it is important for integrated circuits to reduce the chip size thereof as much as possible for cost reduction, etc. Therefore, it is especially desirable to reduce terminals used for inputting and outputting the debug data as much as possible. A one-line communication mode is therefore proposed which uses one input/output terminal for data input/output to transmit/receive data through one communication line connected to this input/output terminal. For example, the Universal Asynchronous Receiver/transmitter (UART) disclosed in Published Japanese Translation of a PCT application No. 2001-508562 is known as such a one-line communication mode.

In the UART, data are transmitted and received between a master communication circuit and a slave communication circuit connected through one communication line. In the UART, one-bit data ("1" or "0") are transmitted and received between the master communication circuit and the slave communication circuit by changing the signal level of the communication line with the master communication circuit or the slave communication circuit.

For example, when the master communication circuit transmits data to the slave communication circuit, the master communication circuit drives the signal level of the communication line to "0". The master communication circuit subsequently drives the signal level of the communication line to "1" if the data to be transmitted is "1" or maintains the signal level of the communication line to "0" without change if the data to be transmitted is "0". The slave communication circuit acquires the signal level of the communication line after a predetermined time has elapsed from the start of the data transmission/reception to receive "1" or "0".

For example, when the master communication circuit receives data from the slave communication circuit, the master communication circuit drives the signal level of the communication line to "0". The master communication circuit subsequently drives the signal level of the communication line to "1". The slave communication circuit maintains the signal level of the communication line to "1" without change if the data transmitted to the master communication circuit is "1" or drives the signal level of the communication line to "0" if the data transmitted to the master communication circuit is "0". The master communication circuit acquires the signal level of the communication line after a predetermined time has elapsed from the start of the data transmission/reception to receive "1" or "0".

As described above, in one-line communication modes such as the UART, the master communication circuit and the slave communication circuit must share time such as the timing of acquiring the signal level of the communication line. Therefore, to ensure the data transmission/reception between the master communication circuit and the slave communication circuit, deviation must be reduced between a clock used for counting time in the master communication circuit and a clock used for counting time in the slave communication circuit.

For example, in the case of the UART, the data transmitted/received between the master communication circuit and the slave communication circuit are a total of 10 bits, which are one start bit, one stop bit, and eight data bits. For example, assuming that the deviation of the clock is 5% for one bit in the master communication circuit and the slave communication circuit, the deviation of 50% may be generated in 10 bits, and the signal level of the communication line is acquired at an unintended timing. Therefore, if the UART is used, the deviation is generally required to be reduced to about 2% to 3% in the clock of the master communication circuit and the slave communication circuit.

When such a one-line communication mode is used to debug an integrated circuit equipped with a microcomputer, the debugged side, i.e., the slave communication circuit generally generates a clock for the one-line communication from the main clock of the microcomputer. Since different circuits have different main clock frequencies, it is difficult to generate an accurate clock for all the main clocks having different frequencies. Therefore, although an oscillator for generating a communication clock is needed in addition to the main clock of the microcomputer to increase the accuracy of the clock of the slave communication circuit, it is not practical to dispose an oscillator for debugging.

SUMMARY OF THE INVENTION

The present invention was conceived in view of the above problems and it is therefore the object of the present invention to provide a master communication circuit, slave communication circuit, and data communicating method that have reduced number of terminals necessary for communication and that can transmit/receive data if the accuracy of the clock is low.

In order to achieve the above object, according to a first aspect of the present invention there is provided a master communication circuit communicatively connected to a slave communication circuit, comprising a timer circuit that can detect a first time; a first output circuit that outputs a first output signal of one logical level for starting a detecting operation of the first time in the timer circuit, when a value transmitted to the slave communication circuit is one logical level, and for starting a detecting operation of a second time longer than the first time in the slave communication circuit; and a second output circuit that outputs a second output signal of the other logical level when the timer circuit detects the first time, wherein if a value of one logical level is transmitted to the slave communication circuit, the value of one logical level is transmitted to the slave communication circuit by not detecting the second time with the slave communication circuit, detecting the first time with the timer circuit, and outputting the second output signal with the second output circuit, and wherein if a value of the other logical level is transmitted to the slave communication circuit, the value of the other logical level is transmitted to the slave communication circuit by not detecting the first time with the timer circuit and detecting the second time with the slave communication circuit.

Other features of the present invention will become apparent from the description therein and the accompanying drawings.

BRIEF DESCRIPTION OF THE DRAWINGS

To understand the present invention and the advantages thereof more thoroughly, the following description should be referenced in conjunction with the accompanying drawings.

DETAILED DESCRIPTION OF THE INVENTION

From the contents of the description and the accompanying drawings, at least the following details will become apparent.

==Circuit Configuration==

Figure 1:
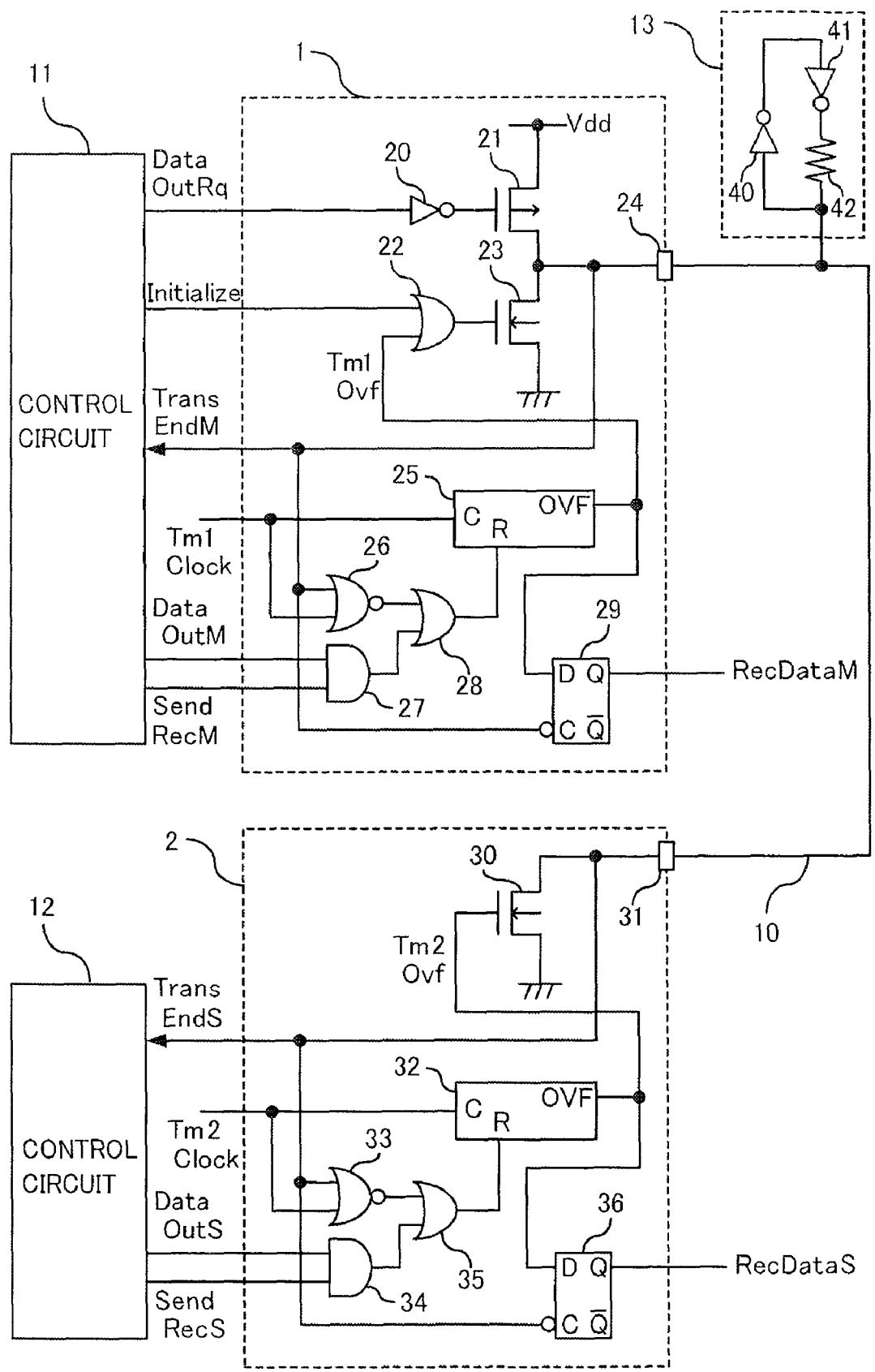
FIG. 1 is a configuration diagram of a data communication system including one embodiment of a master communication circuit and a slave communication circuit of the present invention.

FIG. 1 is a configuration diagram of a data communication system including one embodiment of a master communication circuit and a slave communication circuit of the present invention. A data communication system includes a master communication circuit 1, a slave communication circuit 2, control circuits 11, 12, and a holding circuit 13. The master communication circuit 1 and the slave communication circuit 2 are connected through one communication line 10. The master communication circuit 1 can transmit data to the slave communication circuit 2 or receive data from the slave communication circuit 2 through this communication line 10. For example, the slave communication circuit 2 can be built into an integrated circuit equipped with a microcomputer and the micro computer can be debugged by writing data into the integrated circuit via the slave communication circuit 2 from the master communication circuit 1 disposed externally or by reading data output by the microcomputer via the slave communication circuit 2.

The control circuit 11 is a circuit for controlling the operation of the master communication circuit 1. The control circuit 12 is a circuit for controlling the operation of the slave communication circuit 2.

The holding circuit 13 includes inverters 40, 41 and a resistor 42 and when the master communication circuit 1 or the slave communication circuit 2 outputs a signal to the communication line 10, the holding circuit 13 can hold the signal level of the communication line 10 at the level of the signal. Although the holding circuit 13 is disposed on the communication line 10 in this embodiment, the holding circuit 13 may be disposed on the master communication circuit 1 or the slave communication circuit 2. If the holding circuit 13 is disposed on the master communication circuit 1 or the slave communication circuit 2, the holding circuit 10 is not needed on the communication line 10.

The master communication circuit 1 includes an inverter 20, a P-MOSFET 21 (first output circuit), an OR circuit 22, an N-MOSFET 23 (second output circuit), an input/output terminal 24, a timer circuit 25, a NOR circuit 26, an AND circuit 27, an OR circuit 28, and a D-flip-flop (hereinafter, "D-FF") 29. A circuit configured by the timer circuit 25, the NOR circuit 26, the AND circuit 27, and the OR circuit 28 corresponds to a timer circuit (first timer circuit) of the present invention. The D-FF 29 corresponds to a reception circuit of the present invention.

A voltage Vdd is applied to the source of the P-MOSFET 21 and the drain thereof is connected to the drain of the N-MOSFET 23. The source of the N-MOSFET 23 is grounded. A data output request signal (DataOutRq) output from the control circuit 11 is inverted by the inverter 20 and is output to the gate of the P-MOSFET 21. The gate of the N-MOSFET 23 receives through the OR circuit 22 the input of a logical sum between an initialization signal (Initialize) output from the control circuit 11 and an overflow signal (Tm1Ovf) indicating the overflow detection of the timer circuit 25. The voltage of the connection point between the P-MOSFET 21 and the N-MOSFET 23 is output to the communication line 10 through the input/output terminal 24.

For example, when the data output request signal (DataOutRq) becomes H-level, the P-MOSFET 21 is turned on and the signal level of the communication line 10 becomes H-level (one logical level, a first output signal). Even when the data output request signal (DataOutRq) is subsequently changed to L-level and the P-MOSFET 21 is turned off, the signal level of the communication line 10 is maintained at H-level by the holding circuit 13. For example, when the initialization signal (Initialize) becomes H-level, the N-MOSFET 23 is turned on and the signal level of the communication line 10 becomes L-level. Even when the initialization signal (Initialize) is subsequently changed to L-level and the N-MOSFET 23 is turned off, the signal level of the communication line 10 is maintained at L-level by the holding circuit 13. Similarly, when the overflow detection signal (Tm1Ovf) becomes H-level, the N-MOSFET 23 is turned on and the signal level of the communication line 10 becomes L-level (the other logical level, a second output signal). The signal level of the communication line 10 is output to the control circuit 11 as a transfer end signal (TransEndM) for determining the end of the data transfer between the master communication circuit 1 and the slave communication circuit 2.

The timer circuit 25 is a circuit that detects passage of a predetermined time. A clock signal (Tm1Clock) used for counting of time is input to the clock input terminal C of the timer circuit 25. When the signal level of the reset input terminal R of the timer circuit 25 is changed, for example, from H-level to L-level, the timer circuit 25 starts the counting operation and changes the overflow signal (Tm1Ovf), for example, from L-level to H-level when a predetermined time has elapsed. The detection time of the timer circuit 25 can be changed under the control of the control circuit 11, for example. With regard to the change in the detection time, for example, if the timer circuit 25 is a counter configured by a plurality of D-FFs, the detection time can be changed by defining which D-FF outputs the overflow signal (Tm1Ovf). For example, a plurality of timer circuits with different detection times may be disposed and a timer circuit to be used may be switched under the control of the control circuit 11, etc. For example, the detection time may be stored in a register, etc., and the detection time may be changed by changing the value stored in the register, etc.

The inputs to the NOR circuit 26 are the signal of the communication line 10 and the clock signal (Tm1Clock). Therefore, the output of the NOR circuit 26 is changed correspondingly to the clock signal (Tm1Clock) if the signal level of the communication line 10 is L-level, and is L-level if the signal level of the communication line 10 is H-level.

The inputs to the AND circuit 27 are a transmission data signal (DataOutM) indicating data transmitted to the slave communication circuit 2 and a transmission/reception mode signal (SendRecM) indicating whether data are transmitted to the slave communication circuit 2 or are received from the slave communication circuit 2. In this embodiment, for example, it is assumed that the transmission/reception mode signal (SendRecM) is "1" if data are transmitted to the slave communication circuit 2, i.e., in the case of the transmission mode and that the transmission/reception mode signal (SendRecM) is "0" if data are received from the slave communication circuit 2, i.e., in the case of the reception mode. Therefore, the output of the AND circuit 27 is the transmission data signal (DataOutM) in the case of the transmission mode and is L-level in the case of the reception mode.

The inputs to the OR circuit 28 are the signal output from the NOR circuit 26 and the signal output from the AND circuit 27. The signal output from the OR circuit 28 is input to the reset input terminal R of the timer circuit 25. Therefore, when at least one of the outputs of the NOR circuit 26 and the AND circuit 27 is H-level, the output of the OR circuit 28 becomes H-level and, since the reset input terminal R of the timer circuit 25 becomes H-level, the timer circuit 25 does not perform the counting. When both outputs of the NOR circuit 26 and the AND circuit 27 become L-level, the reset input terminal R of the timer circuit 25 becomes L-level and the timer circuit 25 starts the counting.

The input to the data input terminal D of the D-FF 29 is the overflow signal (Tm1Ovf) of the timer circuit 25. The input to the clock input terminal C of the D-FF 29 is a signal acquired by inverting the signal of the communication line 10. The signal output from the data output terminal Q of the D-FF 29 is the reception data signal (RecDataM) indicating the data received from the slave communication circuit 2. Therefore, for example, when the signal level of the communication line 10 is changed from H-level to L-level, the overflow signal (Tm1Ovf) of the timer circuit 25 is acquired by the D-FF 29 and is output as the reception data signal (RecDataM).

The slave communication circuit 2 includes an N-MOSFET 30 (output circuit), an input/output terminal 31, a timer circuit 32, a NOR circuit 33, an AND circuit 34, an OR circuit 35, and a D-FF 36 (reception circuit). A circuit configured by the timer circuit 32, the NOR circuit 33, the AND circuit 34, and the OR circuit 35 corresponds to a timer circuit (second timer circuit) of the present invention.

The drain of the N-MOSFET 30 is connected to the communication line 10 through the input/output terminal 31 and the source thereof is grounded. The input to the gate of the N-MOSFET 30 is the overflow signal (Tm2Ovf) indicating the overflow detection of the timer circuit 32. Therefore, when the overflow detection signal (Tm2Ovf) becomes H-level, the N-MOSFET 30 is turned on and the signal level of the communication line 10 becomes L-level (the other logical level, the second output signal). The signal level of the communication line 10 is output to the control circuit 12 as a transfer end signal (TransEndS) for determining the end of the data transfer between the master communication circuit 1 and the slave communication circuit 2.

The timer circuit 32 is a circuit that detects passage of a predetermined time. A clock signal (Tm2Clock) used for counting of time is input to the clock input terminal C of the timer circuit 32. When the signal level of the reset input terminal R of the timer circuit 32 is changed, for example, from H-level to L-level, the timer circuit 32 starts the counting operation and changes the overflow signal (Tm2Ovf), for example, from L-level to H-level when a predetermined time has elapsed. The detection time of the timer circuit 32 can be changed as is the case with the timer circuit 25.

The inputs to the NOR circuit 33 are the signal of the communication line 10 and the clock signal (Tm2Clock). Therefore, the output of the NOR circuit 33 is changed correspondingly to the clock signal (Tm2Clock) if the signal level of the communication line 10 is L-level, and is L-level if the signal level of the communication line 10 is H-level.

The inputs to the AND circuit 34 are a transmission data signal (DataOutS) indicating data transmitted to the master communication circuit 1 and a transmission/reception mode signal (SendRecS) indicating whether data are transmitted to the master communication circuit 1 or are received from the master communication circuit 1. In this embodiment, for example, it is assumed that the transmission/reception mode signal (SendRecS) is "1" if data are transmitted to the master communication circuit 1, i.e., in the case of the transmission mode and that the transmission/reception mode signal (SendRecS) is "0" if data are received from the master communication circuit 1, i.e., in the case of the reception mode. Therefore, the output of the AND circuit 34 is the transmission data signal (DataOutS) in the case of the transmission mode and is L-level in the case of the reception mode.

The inputs to the OR circuit 35 are the signal output from the NOR circuit 33 and the signal output from the AND circuit 34. The signal output from the OR circuit 35 is input to the reset input terminal R of the timer circuit 32. Therefore, when at least one of the outputs of the NOR circuit 33 and the AND circuit 34 is H-level, the output of the OR circuit 35 becomes H-level and, since the reset input terminal R of the timer circuit 32 becomes H-level, the timer circuit 32 does not perform the counting. When both outputs of the NOR circuit 33 and the AND circuit 34 become L-level, the reset input terminal R of the timer circuit 32 becomes L-level and the timer circuit 32 starts the counting.

The input to the data input terminal D of the D-FF 36 is the overflow signal (Tm2Ovf) of the timer circuit 32. The input to the clock input terminal C of the D-FF 36 is a signal acquired by inverting the signal of the communication line 10. The signal output from the data output terminal Q of the D-FF 36 is the reception data signal (RecDataS) indicating the data received from the master communication circuit 1. Therefore, for example, when the signal level of the communication line 10 is changed from H-level to L-level, the overflow signal (Tm2Ovf) of the timer circuit 32 is acquired by the D-FF 36 and is output as the reception data signal (RecDataS).

==Description of Operation==

The data transmission/reception operation between the master communication circuit 1 and the slave communication circuit 2 will be described.

(1) Data Transmission

Figure 2:
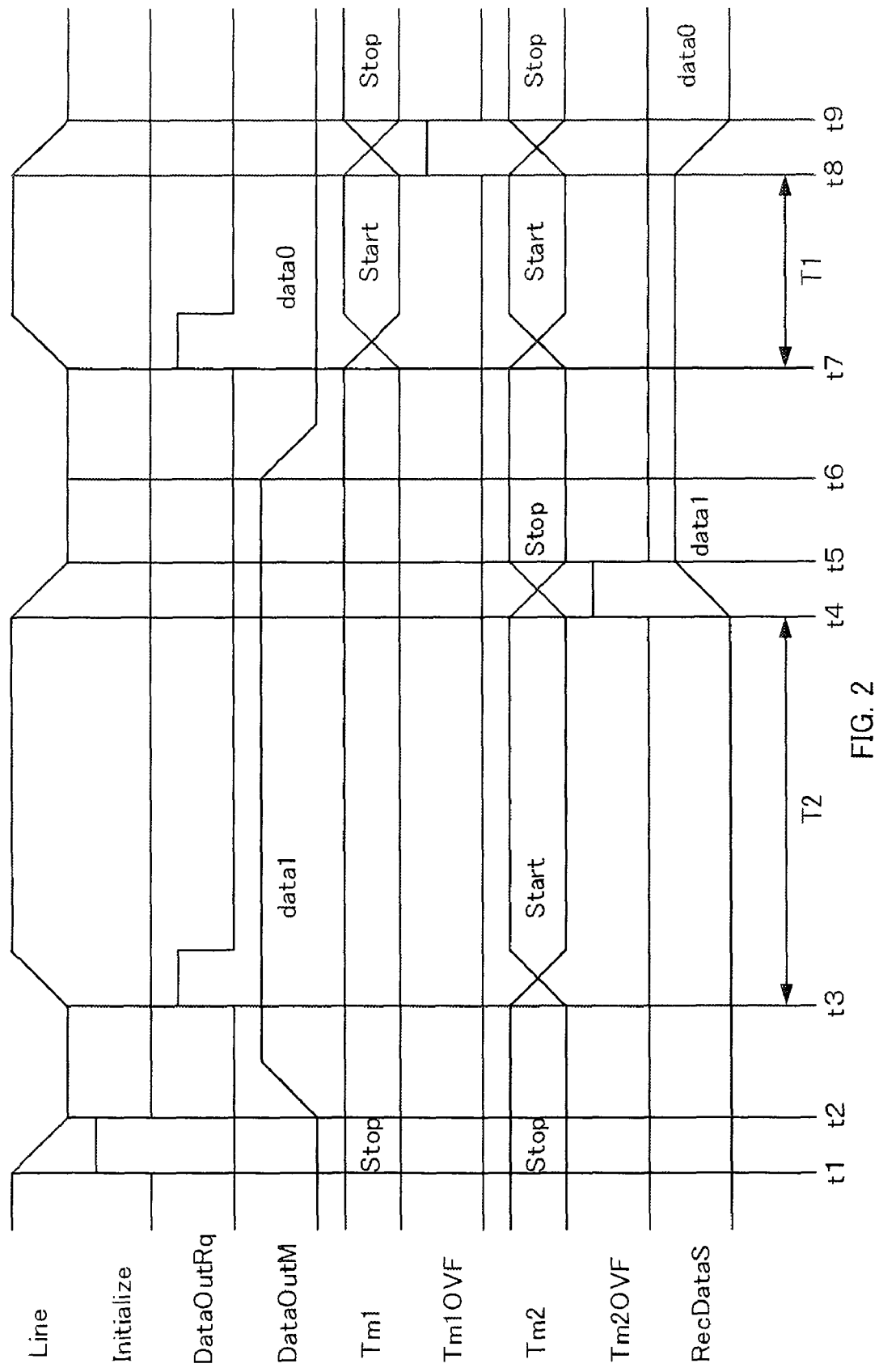
FIG. 2 depicts a timing chart when the master communication circuit transmits data to the slave communication circuit.

Description will be made of the operation when the master communication circuit 1 transmits data to the slave communication circuit 2. FIG. 2 depicts a timing chart when the master communication circuit 1 transmits data to the slave communication circuit 2. When the master communication circuit 1 transmits data to the slave communication circuit 2, it is assumed that a relationship of T1<T2 is established between a time T1 detected by the timer circuit 25 of the master communication circuit 1 and a time T2 detected by the timer circuit 32 of the slave communication circuit 2. The time T1 corresponds to a first time in claims 1 and 6 of the present invention. The time T2 corresponds to a second time of claims 1 and 6 of the present invention.

First, at a time point t1, the initialization signal (Initialize) output from the control circuit 11 becomes H-level. As a result, the N-MOSFET 23 is turned on and the signal level of the communication line 10 becomes L-level. Even when the initialization signal (Initialize) becomes L-level at a time point t2, the signal level of the communication line 10 is maintained at L-level by the holding circuit 13. The transmission data signal (DataOutM) "1" (the second logical value) is input from the control circuit 11.

At a time point t3, the data output request signal (DataOutRq) output from the control circuit 11 becomes H-level. As a result, the P-MOSFET 21 is turned on and the signal level of the communication line 10 becomes H-level. It is assumed that the data output request signal (DataOutRq) is maintained at H-level for a period shorter than T1. Since the transmission data signal (DataOutM) is "1" and the transmission/reception mode signal (SendRecM) is "1" in the master communication circuit 1, the output of the AND circuit 27 is H-level, and the reset input terminal R of the timer circuit 25 is maintained at H-level. Therefore, the timer circuit 25 of the master communication circuit 1 does not start the counting operation. On the other hand, in the slave communication circuit 2, since the transmission/reception mode signal (SendRecS) is "0", the output of the AND circuit 34 is L-level, and since the signal level of the communication line 10 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T2.

At a time point t4 after the time T2 has elapsed from the time point t3, the overflow signal (Tm2Ovf) output from the timer circuit 32 of the slave communication circuit 2 becomes H-level. As a result, the N-MOSFET 30 is turned on and the signal level of the communication line 10 becomes L-level. When the signal level of the communication line 10 becomes L-level, the signal input to the clock input terminal of the D-FF 36 is changed from L-level to H-level; the H-level overflow signal (Tm2Ovf) output from the timer circuit 32 is acquired by the D-FF 36; and the reception data signal (RecDataS) becomes H-level. That is, the master communication circuit 1 transmits "1" to the slave communication circuit 2.

When the signal level of the communication line 10 becomes L-level, the signal level of the reset input terminal R of the timer circuit 32 alternately repeats H-level and L-level correspondingly to the clock signal (Tm2Clock); the timer circuit 32 is reset; and the overflow signal (Tm2Ovf) changes to L-level at a time point t5.

When the transfer end signal (TransEndM) changes to L-level in accordance with the change in the signal level of the communication line 10, the control circuit 11 detects that the data transmission to the slave communication circuit 2 is completed, and starts output of the next transmission data signal (DataOutM) "0" (the first logical value) at a time point t6.

The data output request signal (DataOutRq) output from the control circuit 11 subsequently becomes H-level at a time point t7. As a result, the P-MOSFET 21 is turned on and the signal level of the communication line 10 becomes H-level. Since the transmission data signal (DataOutM) is "0" in the master communication circuit 1, the output of the AND circuit 27 is L-level, and since the signal level of the communication line 10 is H-level, the output of the NOR circuit 26 is L-level, and the reset input terminal R of the timer circuit 25 changes to L-level. Therefore, the timer circuit 25 of the master communication circuit 1 starts the detecting operation for the time T1. In the slave communication circuit 2, since the transmission/reception mode signal (SendRecS) is "0", the output of the AND circuit 34 is L-level, and since the signal level of the communication line 10 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T2.

At a time point t8 after the time T1 has elapsed from the time point t7, the overflow signal (Tm1Ovf) output from the timer circuit 25 of the master communication circuit 1 becomes H-level. Because of T1<T2, the overflow signal (Tm2Ovf) output from the timer circuit 32 of the slave communication circuit 2 is maintained at L-level. As a result, the N-MOSFET 23 is turned on and the signal level of the communication line 10 becomes L-level. When the signal level of the communication line 10 becomes L-level, the signal input to the clock input terminal of the D-FF 36 is changed from L-level to H-level; the L-level overflow signal (Tm2Ovf) output from the timer circuit 32 is acquired by the D-FF 36; and the reception data signal (RecDataS) becomes L-level. That is, the master communication circuit 1 transmits "0" to the slave communication circuit 2.

When the signal level of the communication line 10 becomes L-level, the signal level of the reset input terminal R of the timer circuit 25 alternately repeats H-level and L-level correspondingly to the clock signal (Tm1Clock); the timer circuit 25 is reset; and the overflow signal (Tm1Ovf) changes to L-level at a time point t9. When the signal level of the communication line 10 becomes L-level, the signal level of the reset input terminal R of the timer circuit 32 alternately repeats H-level and L-level correspondingly to the clock signal (Tm2Clock), and the timer circuit 32 is reset.

By establishing the relationship of T1<T2 between the time T1 detected by the timer circuit 25 of the master communication circuit 1 and the time T2 detected by the timer circuit 32 of the slave communication circuit 2, data of "1" or "0" can be transmitted in accordance with whether the detecting operation is started in the timer circuit 25 of the master communication circuit 1 as above. By setting a time difference between T1 and T2 in accordance with the accuracies of the clock signal (Tm1Clock) and the clock signal (Tm2Clock), the master communication circuit 1 can normally transmit the data to the slave communication circuit 2 even if the deviation is generate in the time T1 and time T2. For example, if the deviation can be 50% in both the clock signal (Tm1Clock) and the clock signal (Tm2Clock), the data can normally be transmitted by setting the time T1 to 10 ns and the time T2 to 40 ns since T1<T2 is satisfied even when the time T1 is extended by 50% to 15 ns and the time T2 is reduced by 50% to 20 ns.

By repeatedly performing the process shown in FIG. 2, data of a plurality of bits can be transmitted from the master communication circuit 1 to the slave communication circuit 2. In this case, when the transfer end signal (TransEndM) changes from H-level to L-level, the control circuit 11 may detect that the one-bit data transmission is completed, and the data output request signal (DataOutRq) may be changed to H-level when the next transmission data (DataOutM) is output. If the data of a plurality of bits are transmitted from the master communication circuit 1 to the slave communication circuit 2, the D-FF 36 of the slave communication circuit 2 can be a shift register. In this case, the overflow signal (Tm2Ovf) output from the timer circuit 32 may be shift-input to the shift register at the timing when the communication line 10 changes from H-level to L-level.

(2) Data Reception

Figure 3:
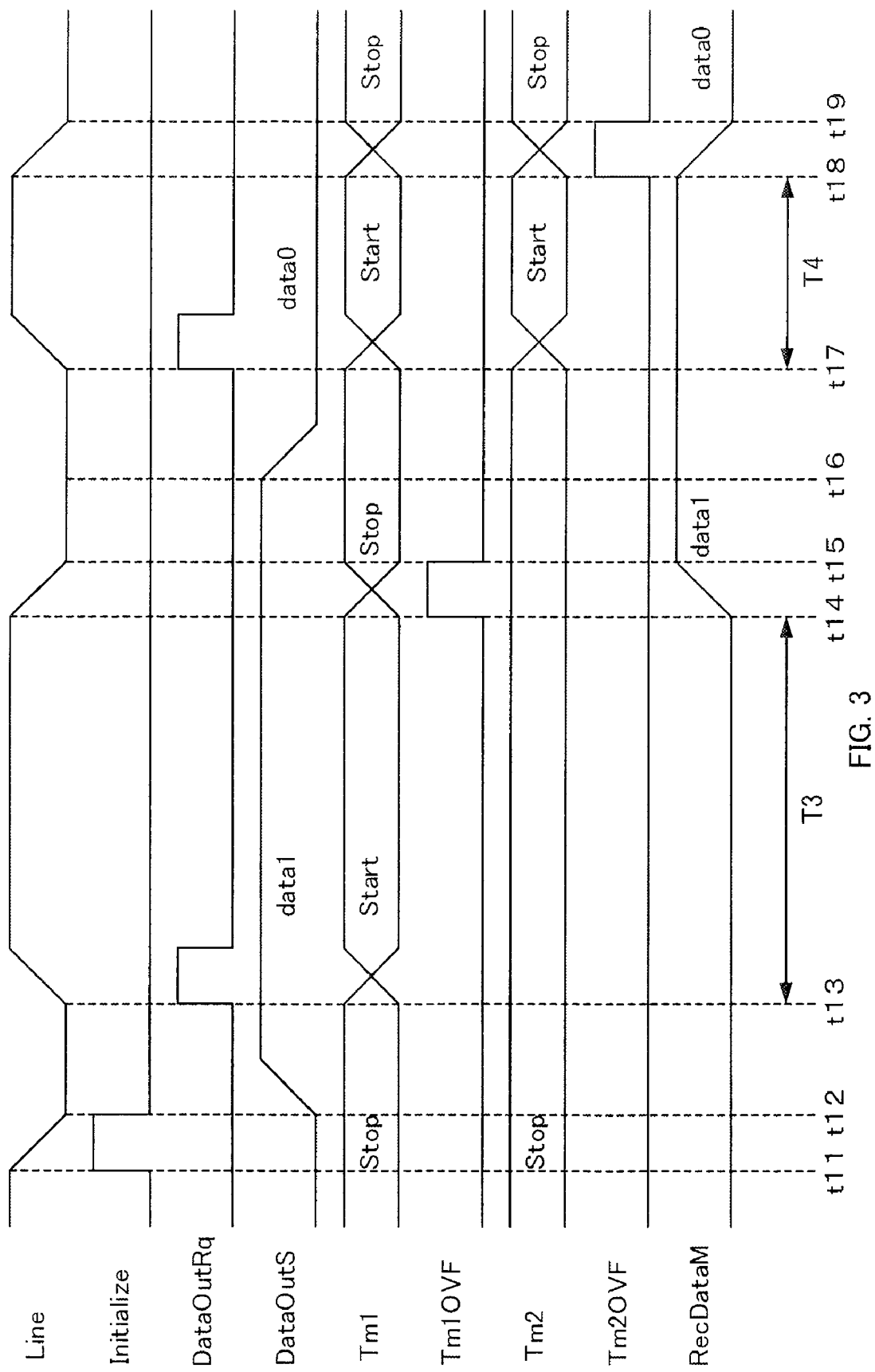
FIG. 3 depicts a timing chart when the master communication circuit receives data from the slave communication circuit.

Description will be made of the operation when the master communication circuit 1 receives data from the slave communication circuit 2. FIG. 3 depicts a timing chart when the master communication circuit 1 receives data from the slave communication circuit 2. When the master communication circuit 1 receives data from the slave communication circuit 2, it is assumed that a relationship of T3>T4 is established between a time T3 detected by the timer circuit 25 of the master communication circuit 1 and a time T4 detected by the timer circuit 32 of the slave communication circuit 2. The time T3 corresponds to the first time in claims 16 of the present invention. The time T4 corresponds to the second time of claims 16 of the present invention.

The detection time of the timer circuit 25 can be changed from T1 to T3 and the detection time of the timer circuit 32 can be changed from T2 to T4 under the control of the control circuits 11, 12 as above. For example, the detection time of the timer circuit 25 may be switched correspondingly to the transmission/reception mode signal (SendRecM) output from the control circuit 11 and the detection time of the timer circuit 32 may be switched correspondingly to the transmission/reception mode signal (SendRecS) output from the control circuit 12.

First, at a time point t11, the initialization signal (Initialize) output from the control circuit 11 becomes H-level. As a result, the N-MOSFET 23 is turned on and the signal level of the communication line 10 becomes L-level. Even when the initialization signal (Initialize) becomes L-level at a time point t12, the signal level of the communication line 10 is maintained at L-level by the holding circuit 13. The transmission data signal (DataOuts) "1" is input from the control circuit 12.

At a time point t13, the data output request signal (DataOutRq) output from the control circuit 11 becomes H-level. As a result, the P-MOSFET 21 is turned on and the signal level of the communication line 10 becomes H-level. It is assumed that the data output request signal (DataOutRq) is maintained at H-level for a period shorter than T4. Since the transmission/reception mode signal (SendRecM) is "0" in the master communication circuit 1, the output of the AND circuit 27 is L-level, and since the signal level of the communication line 10 is H-level, the output of the NOR circuit 26 is L-level, and the reset input terminal R of the timer circuit 25 changes to L-level. Therefore, the timer circuit 25 of the master communication circuit 1 starts the detecting operation for the time T3. On the other hand, in the slave communication circuit 2, since the transmission data signal (DataOutS) is "1" and the transmission/reception mode signal (SendRecS) is "1", the output of the AND circuit 34 is H-level, and the reset input terminal R of the timer circuit 32 is maintained at H-level. Therefore, the timer circuit 32 of the slave communication circuit 2 does not start the counting operation.

At a time point t14 after the time T3 has elapsed from the time point t13, the overflow signal (Tm1Ovf) output from the timer circuit 25 of the master communication circuit 1 becomes H-level. As a result, the N-MOSFET 23 is turned on and the signal level of the communication line 10 becomes L-level. When the signal level of the communication line 10 becomes L-level, the signal input to the clock input terminal of the D-FF 29 is changed from L-level to H-level; the H-level overflow signal (Tm1Ovf) output from the timer circuit 25 is acquired by the D-FF 29; and the reception data signal (RecDataM) becomes H-level. That is, the master communication circuit 1 receives "1" from the slave communication circuit 2.

When the signal level of the communication line 10 becomes L-level, the signal level of the reset input terminal R of the timer circuit 25 alternately repeats H-level and L-level correspondingly to the clock signal (Tm1Clock); the timer circuit 25 is reset; and the overflow signal (Tm1Ovf) changes to L-level at a time point t15.

When the transfer end signal (TransEndS) changes to L-level in accordance with the change in the signal level of the communication line 10, the control circuit 12 detects that the data transmission to the master communication circuit 1 is completed, and starts output of the next transmission data signal (DataOutS) "0" at a time point t16.

The data output request signal (DataOutRq) output from the control circuit 11 subsequently becomes H-level at a time point t17. As a result, the P-MOSFET 21 is turned on and the signal level of the communication line 10 becomes H-level. Since the transmission/reception mode signal (SendRecS) is "0" in the master communication circuit 1, the output of the AND circuit 27 is L-level, and since the signal level of the communication line 10 is H-level, the output of the NOR circuit 26 is L-level, and the reset input terminal R of the timer circuit 25 changes to L-level. Therefore, the timer circuit 25 of the master communication circuit 1 starts the detecting operation for the time T3. In the slave communication circuit 2, since the transmission data signal (DataOutM) is "0", the output of the AND circuit 34 is L-level, and since the signal level of the communication line 10 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T4.

At a time point t18 after the time T4 has elapsed from the time point t17, the overflow signal (Tm2Ovf) output from the timer circuit 32 of the slave communication circuit 2 becomes H-level. Because of T3>T4, the overflow signal (Tm1Ovf) output from the timer circuit 25 of the master communication circuit 1 is maintained at L-level. As a result, the N-MOSFET 30 is turned on and the signal level of the communication line 10 becomes L-level. When the signal level of the communication line 10 becomes L-level, the signal input to the clock input terminal of the D-FF 29 is changed from L-level to H-level; the L-level overflow signal (Tm1Ovf) output from the timer circuit 25 is acquired by the D-FF 29; and the reception data signal (RecDataM) becomes L-level. That is, the master communication circuit 1 receives "0" from the slave communication circuit 2.

When the signal level of the communication line 10 becomes L-level, the signal level of the reset input terminal R of the timer circuit 25 alternately repeats H-level and L-level correspondingly to the clock signal (Tm1Clock) and the timer circuit 25 is reset. When the signal level of the communication line 10 becomes L-level, the signal level of the reset input terminal R of the timer circuit 32 alternately repeats H-level and L-level correspondingly to the clock signal (Tm2Clock); the timer circuit 32 is reset; and the overflow signal (Tm2Ovf) changes to L-level at a time point t19.

By establishing the relationship of T3>T4 between the time T3 detected by the timer circuit 25 of the master communication circuit 1 and the time T4 detected by the timer circuit 32 of the slave communication circuit 2, the master communication circuit 1 can receive data of "1" or "0" from the slave communication circuit 2 in accordance with whether the detecting operation is started in the timer circuit 32 of the slave communication circuit 2 as above. By setting a time difference between T3 and T4 in accordance with the accuracies of the clock signal (Tm1Clock) and the clock signal (Tm2Clock), the master communication circuit 1 can normally receive the data from the slave communication circuit 2 even if the deviation is generate in the time T3 and time T4. For example, if the deviation can be 50% in both the clock signal (Tm1Clock) and the clock signal (Tm2Clock), the data can normally be transmitted by setting the time T3 to 40 ns and the time T4 to 10 ns since T3>T4 is satisfied even when the time T3 is reduced by 50% to 20 ns and the time T4 is extended by 50% to 15 ns.

By repeatedly performing the process shown in FIG. 3, data of a plurality of bits can be received by the master communication circuit 1 from the slave communication circuit 2. In this case, when the transfer end signal (TransEndS) changes from H-level to L-level, the control circuit 12 may detect that the one-bit data transmission is completed, and the next transmission data (DataOutS) may be output. When the transfer end signal (TransEndM) changes from H-level to L-level, the control circuit 11 may detect that the one-bit data transmission is completed, and may change the data output request signal (DataOutRq) to H-level to receive the next data. If the data of a plurality of bits are received by the master communication circuit 1 from the slave communication circuit 2, the D-FF 29 of the master communication circuit 1 can be a shift register. In this case, the overflow signal (Tm1Ovf) output from the timer circuit 25 may be shift-input to the shift register at the timing when the communication line 10 changes from H-level to L-level.

==Timer Circuit (Another Embodiment)==

Figure 4:
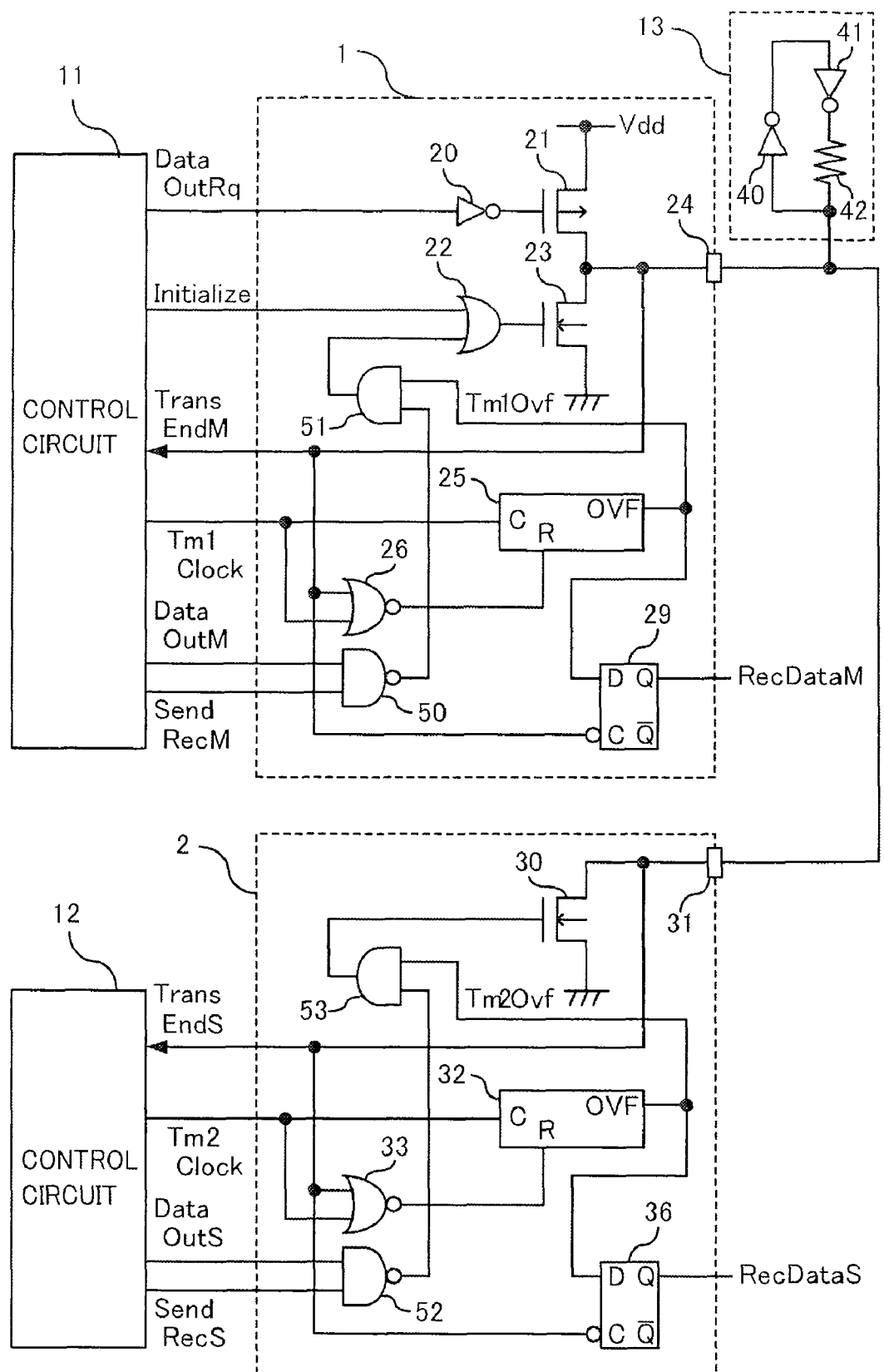
FIG. 4 depicts a configuration example of the master communication circuit and the slave communication circuit when a timer circuit performs counting operation regardless of a transmission/reception mode and transmission data.

Although the timer circuit 25 is still reset in the circuit shown in FIG. 1 when the master communication circuit 1 transmits the data "1" to the slave communication circuit 2, the timer circuit 25 can be in the state of performing the counting operation. Although the timer circuit 32 is still reset when the master communication circuit 1 receives the data "1" from the slave communication circuit 2, the timer circuit 32 can be in the state of performing the counting operation. FIG. 4 depicts a configuration example of the master communication circuit 1 and the slave communication circuit 2 when the timer circuits 25, 32 perform the counting operation regardless of the transmission/reception mode and the transmission data.

As shown in FIG. 4, the master communication circuit 1 does not include the AND circuit 27 and the OR circuit 28 shown in FIG. 1 and includes a NAND circuit 50 and an AND circuit 51 instead. In this case, a circuit configured by the timer circuit 25, the NOR circuit 26, the NAND circuit 50, and the AND circuit 51 corresponds to the timer circuit (first timer circuit) of the present invention. The signal output from the NOR circuit 26 is input to the reset input terminal R of the timer circuit 25. The inputs to the NAND circuit 50 are the transmission data signal (DataOutM) and the transmission/reception mode signal (SendRecM). The inputs to the AND circuit 51 are the signal output from the NAND circuit 50 and the overflow signal (Tm1Ovf) output from the timer circuit 25, and the signal output from the AND circuit 51 is input to the OR circuit 22.

The slave communication circuit 2 does not include the AND circuit 34 and the OR circuit 35 shown in FIG. 1 and includes a NAND circuit 52 and an AND circuit 53 instead. In this case, a circuit configured by the timer circuit 32, the NOR circuit 33, the NAND circuit 52, and the AND circuit 53 corresponds to the timer circuit (second timer circuit) of the present invention. The signal output from the NOR circuit 33 is input to the reset input terminal R of the timer circuit 32. The inputs to the NAND circuit 52 are the transmission data signal (DataOutS) and the transmission/reception mode signal (SendRecS). The inputs to the AND circuit 53 are the signal output from the NAND circuit 52 and the overflow signal (Tm2Ovf) output from the timer circuit 32, and the signal output from the AND circuit 53 is input to the gate of the N-MOSFET 30.

In the case of the configuration shown in FIG. 4, when the signal level of the communication line 10 changes to H-level, the timer circuits 25, 32 start the counting operation since the signal level of the reset input terminal R of the timer circuits 25, 32 becomes L-level regardless of the transmission/reception mode and the transmission data. When the predetermined set time T1 or T3 is detected, the timer circuit 25 outputs the H-level overflow signal (Tm1Ovf). When the predetermined set time T2 or T4 is detected, the timer circuit 32 outputs the H-level overflow signal (Tm2Ovf).

When the master communication circuit 1 transmits the data "1" to the slave communication circuit 2, since the transmission/reception mode signal (SendRecM) and the transmission data signal (DataOutM) are "1", the signal output from the NAND circuit 50 becomes L-level. In this case, the signal output from the AND circuit 51 is L-level regardless of the overflow signal (Tm1Ovf) of the timer circuit 25. That is, when the master communication circuit 1 transmits the data "1" to the slave communication circuit 2, the circuit configured by the timer circuit 25, the NOR circuit 26, the NAND circuit 50, and the AND circuit 51 does not perform the detecting operation for the time T1. When the master communication circuit 1 transmits the data "0" to the slave communication circuit 2, since the transmission data signal (DataOutM) is "0", the signal output from the NAND circuit 50 becomes H-level. In this case, the signal output from the AND circuit 51 is changed correspondingly to the overflow signal (Tm1Ovf) of the timer circuit 25. That is, when the master communication circuit 1 transmits the data "0" to the slave communication circuit 2, the circuit configured by the timer circuit 25, the NOR circuit 26, the NAND circuit 50, and the AND circuit 51 performs the detecting operation for the time T1.

When the master communication circuit 1 receives the data "1" from the slave communication circuit 2, since the transmission/reception mode signal (SendRecS) and the transmission data signal (DataOutS) are "1", the signal output from the NAND circuit 52 becomes L-level. In this case, the signal output from the AND circuit 53 is L-level regardless of the overflow signal (Tm2Ovf) of the timer circuit 32. That is, when the master communication circuit 1 receives the data "1" from the slave communication circuit 2, the circuit configured by the timer circuit 32, the NOR circuit 33, the NAND circuit 52, and the AND circuit 53 does not perform the detecting operation for the time T4. When the master communication circuit 1 receives the data "0" from the slave communication circuit 2, since the transmission data signal (DataOutS) is "0", the signal output from the NAND circuit 52 becomes H-level. In this case, the signal output from the AND circuit 53 is changed correspondingly to the overflow signal (Tm2Ovf) of the timer circuit 32. That is, when the master communication circuit 1 receives the data "0" from the slave communication circuit 2, the circuit configured by the timer circuit 32, the NOR circuit 33, the NAND circuit 52, and the AND circuit 53 performs the detecting operation for the time T4.

==Wireless Communication==

Although the master communication circuit 1 and the slave communication circuit 2 transmit and receive data through the one communication line 10 in the circuit shown in FIG. 1, the same procedure can be performed through wireless communication such as magnetic field coupling and electric field coupling.

(1) Magnetic Field Coupling

Figure 5:
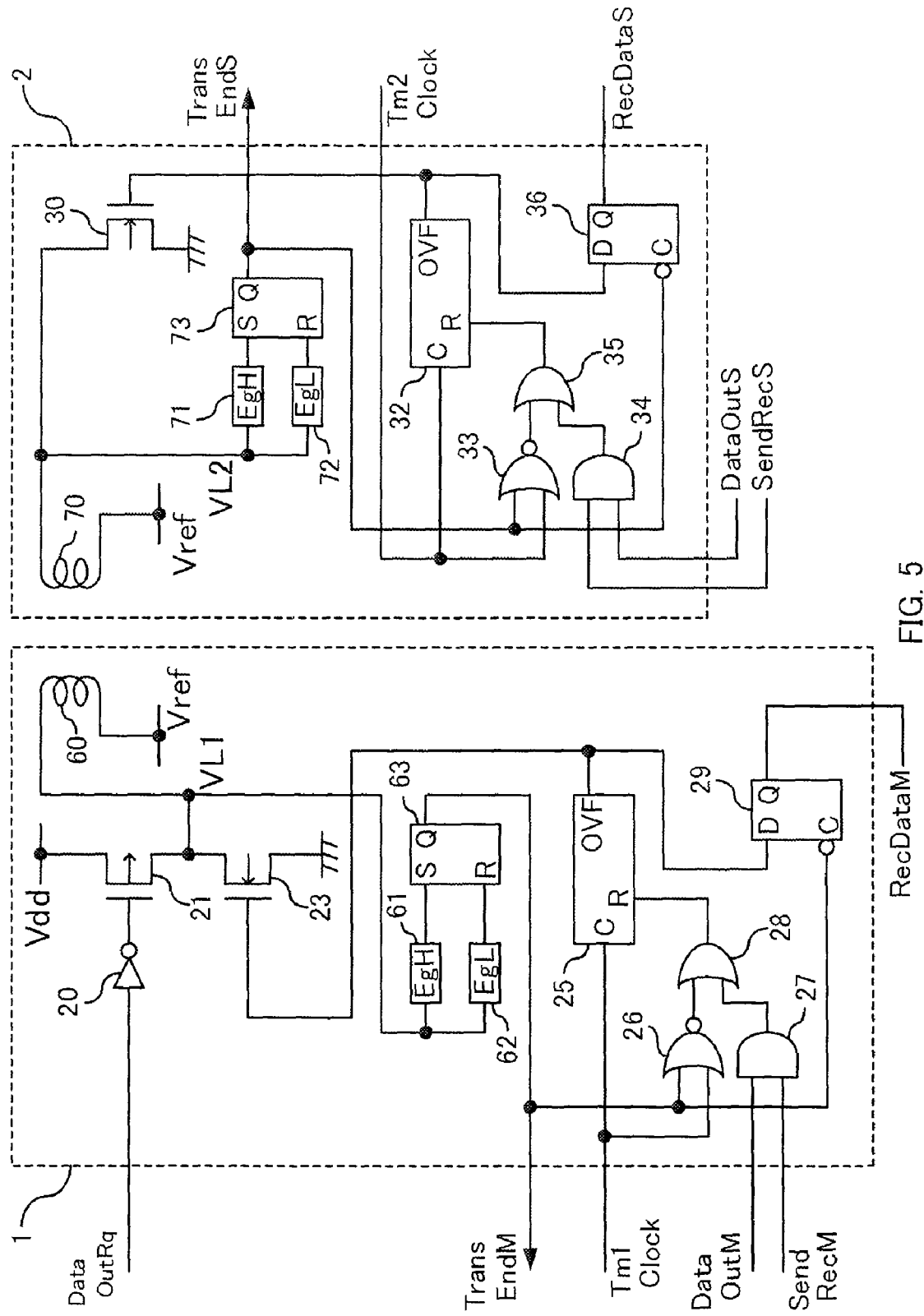
FIG. 5 depicts a configuration example of the master communication circuit and the slave communication circuit when wireless communication is performed through magnetic field coupling.

FIG. 5 depicts a configuration example of the master communication circuit 1 and the slave communication circuit 2 when the wireless communication is performed through the magnetic field coupling. As shown in FIG. 5, the master communication circuit 1 does not include the input/output terminal 24 shown in FIG. 1 and includes a coil 60 (wireless communication circuit), an edge detection circuits 61, 62, and an SR-flip-flop (hereinafter, "SR-FF") 63. The SR-FF 63 corresponds to a memory circuit of the present invention.

The voltage of the connection point between the P-MOSFET 21 and the N-MOSFET 23 is applied to one end of the coil 60 and a middle point voltage Vref is applied to the other end of the coil 60. Therefore, when the P-MOSFET 21 is turned on and the N-MOSFET 23 is turned off, a current is applied from the P-MOSFET 21 to the coil 60. When the P-MOSFET 21 is turned off and the N-MOSFET 23 is turned on, a current is applied from the coil 60 to the N-MOSFET 23.

The voltage of the connection point between the P-MOSFET 21 and the N-MOSFET 23, i.e., a voltage VL1 at one end of the coil 60 is applied to the edge detection circuits 61, 62. When it is detected that the voltage VL1 changes to H-level, the edge detection circuit 61 outputs an H-level signal, for example. When it is detected that the voltage VL1 changes to L-level, the edge detection circuit 62 outputs an H-level signal, for example.

The output signal of the edge detection circuit 61 is input to the data input terminal S of the SR-FF 63. The output signal of the edge detection circuit 62 is input to the data input terminal R of the SR-FF 63. Therefore, when the voltage VL1 changes to H-level and the output signal of the edge detection circuit 61 becomes H-level, the signal output from the data output terminal Q of the SR-FF 63 becomes H-level. When the voltage VL1 changes to L-level and the output signal of the edge detection circuit 62 becomes H-level, the signal output from the data output terminal Q of the SR-FF 63 becomes L-level. The signal output from the data output terminal Q of the SR-FF 63 is input to the NOR circuit 26. The signal output from the data output terminal Q of the SR-FF 63 is inverted and input to the clock input terminal of the D-FF 29. The signal output from the data output terminal Q of the SR-FF 63 is the transfer end signal (TransEndM) to the control circuit 11. That is, the signal level of the signal output from the data output terminal Q of the SR-FF 63 is equivalent to the signal level of the communication line 10 shown in FIG. 1.

The slave communication circuit 2 does not include the input/output terminal 31 shown in FIG. 1 and includes a coil 70 (wireless communication circuit), an edge detection circuits 71, 72, and an SR-FF 73 (memory circuit).

One end of the coil 70 is connected to the drain of the N-MOSFET 30 and the middle point voltage Vref is applied to the other end of the coil 70. Therefore, when the N-MOSFET 30 is turned on, a current is applied from the coil 70 to the N-MOSFET 30.

The voltage of the drain of the N-MOSFET 30, i.e., a voltage VL2 at one end of the coil 70 is applied to the edge detection circuits 71, 72. When it is detected that the voltage VL2 changes to H-level, the edge detection circuit 71 outputs an H-level signal, for example. When it is detected that the voltage VL2 changes to L-level, the edge detection circuit 72 outputs an H-level signal, for example.

The output signal of the edge detection circuit 71 is input to the data input terminal S of the SR-FF 73. The output signal of the edge detection circuit 72 is input to the data input terminal R of the SR-FF 73. Therefore, when the voltage VL2 changes to H-level and the output signal of the edge detection circuit 71 becomes H-level, the signal output from the data output terminal Q of the SR-FF 73 becomes H-level. When the voltage VL2 changes to L-level and the output signal of the edge detection circuit 72 becomes H-level, the signal output from the data output terminal Q of the SR-FF 73 becomes L-level. The signal output from the data output terminal Q of the SR-FF 73 is input to the NOR circuit 33. The signal output from the data output terminal Q of the SR-FF 73 is inverted and input to the clock input terminal of the D-FF 36. The signal output from the data output terminal Q of the SR-FF 73 is the transfer end signal (TransEndS) to the control circuit 12. That is, the signal level of the signal output from the data output terminal Q of the SR-FF 73 is equivalent to the signal level of the communication line 10 shown in FIG. 1.

While the master communication circuit 1 and the slave communication circuit 2 are in the vicinity of each other such that the magnetic field coupling can occur between the coils 60, 70, if the same procedure is performed as in the case of using the communication line 10, data can be transmitted and received between the master communication circuit 1 and the slave communication circuit 2.

Figure 6:
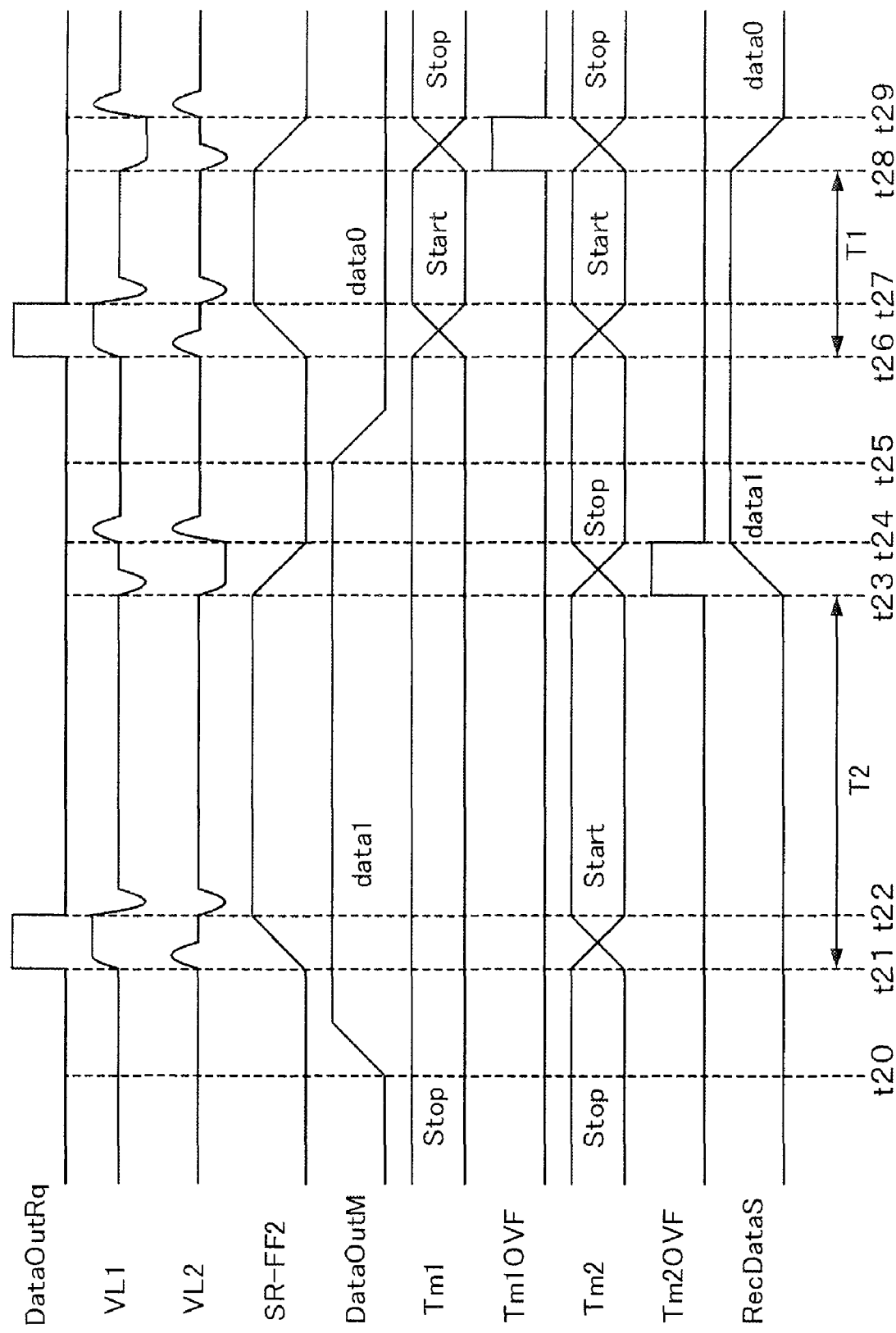
FIG. 6 depicts a timing chart when the master communication circuit transmits data to the slave communication circuit through magnetic field coupling.

FIG. 6 depicts a timing chart when the master communication circuit 1 transmits data to the slave communication circuit 2 through the magnetic field coupling. When the master communication circuit 1 transmits data to the slave communication circuit 2, it is assumed that a relationship of T1<T2 is established between the time T1 detected by the timer circuit 25 of the master communication circuit 1 and the time T2 detected by the timer circuit 32 of the slave communication circuit 2.

First, at a time point t20, the transmission data signal (DataOutM) "1" is input from the control circuit 11. At a time point t21, the data output request signal (DataOutRq) output from the control circuit 11 becomes H-level. As a result, the P-MOSFET 21 is turned on; a current is applied from the P-MOSFET 21 toward the coil 60; and the voltage VL1 changes to H-level. A magnetic field is generated by applying a current to the coil 60 and is transmitted to the coil 70; a current is generated from the N-MOSFET 30 toward the coil 70; and the voltage VL2 changes to H-level. As a result, the signal output from the data output terminal Q of the SR-FF 63, 73 becomes H-level. Since the transmission data signal (DataOutM) is "1" and the transmission/reception mode signal (SendRecM) is "1" in the master communication circuit 1, the output of the AND circuit 27 is H-level, and the reset input terminal R of the timer circuit 25 is maintained at H-level. Therefore, the timer circuit 25 of the master communication circuit 1 does not start the counting operation. On the other hand, in the slave communication circuit 2, since the transmission/reception mode signal (SendRecS) is "0", the output of the AND circuit 34 is L-level, and since the signal level of the signal output from the data output terminal Q is H-level, the output of the NOR circuit 33 becomes L-level, and the reset input terminal R of the timer circuit 32 changes to L-level. Therefore, the timer circuit 32 of the slave communication circuit 2 starts the detecting operation for the time T2.

Although the P-MOSFET 21 is turned off and a back electromotive force is generated for the voltage VL1 and the voltage VL2 when the data output request signal (DataOutRq) becomes L-level at a time point t22, it is assumed that the edge detection circuits 62, 72 do not detect this change. It is assumed that the data output request signal (DataOutRq) is maintained at H-level for a period shorter than T1.

At a time point t23 after the time T2 has elapsed from the time point t21, the overflow signal (Tm2Ovf) output from the timer circuit 32 of the slave communication circuit 2 becomes H-level. As a result, the N-MOSFET 30 is turned on; a current is applied from the coil 70 toward the N-MOSFET 30; and the voltage VL2 changes to L-level. A magnetic field is generated by applying a current to the coil 70 and is transmitted to the coil 60; a current is generated from the coil 60 toward the N-MOSFET 23; and the voltage VL1 changes to L-level. As a result, the signal output from the data output terminal Q of the SR-FF 63, 73 becomes L-level. When the signal level of the signal output from the data output terminal Q of the SR-FF 73 becomes L-level, the signal input to the clock input terminal of the D-FF 36 is changed from L-level to H-level; the H-level overflow signal (Tm2Ovf) output from the timer circuit 32 is acquired by the D-FF 36; and the reception data signal (RecDataS) becomes H-level. That is, the master communication circuit 1 transmits "1" to the slave communication circuit 2.

When the signal level of the signal output from the data output terminal Q of the SR-FF 73 becomes L-level, the signal level of the reset input terminal R of the timer circuit 32 alternately repeats H-level and L-level correspondingly to the clock signal (Tm2Clock); the timer circuit 32 is reset; and the overflow signal (Tm2Ovf) changes to L-level at a time point t24.

Although the N-MOSFET 30 is turned off and a back electromotive force is generated for the voltage VL1 and the voltage VL2 when the overflow signal (Tm2Ovf) becomes L-level at the time point t24, it is assumed that the edge detection circuits 61, 71 do not detect this change.

When the transfer end signal (TransEndM) changes to L-level in accordance with the change in the signal level of the signal output from the data output terminal Q of the SR-FF 63, the control circuit 11 detects that the data transmission to the slave communication circuit 2 is completed, and starts output of the next transmission data signal (DataOutM) "0" at a time point t25.

The data output request signal (DataOutRq) output from the control circuit 11 subsequently becomes H-level at a time point t26. As a result, the P-MOSFET 21 is turned on; a current is applied from the P-MOSFET 21 toward the coil 60; and the voltage VL1 changes to H-level. A magnetic field is generated by applying a current to the coil 60 and is transmitted to the coil 70; a current is generated from the N-MOSFET 30 toward the coil 70; and the voltage VL2 changes to H-level. As a result, the signal output from the data output terminal Q of the SR-FF 63, 73 becomes H-level. Since the transmission data signal (DataOutM) is "0" in the master communication circuit 1, the output of the AND circuit 27 is L-level, and since the signal level of the signal output from the data output terminal Q of the SR-FF 63 is H-level, the output of the NOR circuit 26 is L-level, and the reset input terminal R of the timer circuit 25 changes to L-level. Therefore, the timer circuit 25 of the master communication circuit 1 starts the detecting operation for the time T1. In the slave communication circuit 2, since the transmission/reception mode signal (SendRecS) is "0", the output of the AND circuit 34 is L-level, and since the signal level of the signal output from the data output terminal Q of the SR-FF 73 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T2.

Although the P-MOSFET 21 is turned off and a back electromotive force is generated for the voltage VL1 and the voltage VL2 when the data output request signal (DataOutRq) becomes L-level at a time point t27, it is assumed that the edge detection circuits 62, 72 do not detect this change.

At a time point t28 after the time T1 has elapsed from the time point t26, the overflow signal (Tm1Ovf) output from the timer circuit 25 of the master communication circuit 1 becomes H-level. Because of T1<T2, the overflow signal (Tm2Ovf) output from the timer circuit 32 of the slave communication circuit 2 is maintained at L-level. As a result, the N-MOSFET 23 is turned on; a current is applied from the coil 60 toward the N-MOSFET 23; and the voltage VL1 changes to L-level. A magnetic field is generated by applying a current to the coil 60 and is transmitted to the coil 70; a current is generated from the coil 70 toward the N-MOSFET 30; and the voltage VL2 changes to L-level. As a result, the signal output from the data output terminal Q of the SR-FF 63, 73 becomes L-level. When the signal level of the signal output from the data output terminal Q of the SR-FF 73 becomes L-level, the signal input to the clock input terminal of the D-FF 36 is changed from L-level to H-level; the L-level overflow signal (Tm2Ovf) output from the timer circuit 32 is acquired by the D-FF 36; and the reception data signal (RecDataS) becomes L-level. That is, the master communication circuit 1 transmits "0" to the slave communication circuit 2.

When the signal level of the signal output from the data output terminal Q of the SR-FF 63 becomes L-level, the signal level of the reset input terminal R of the timer circuit 25 alternately repeats H-level and L-level correspondingly to the clock signal (Tm1Clock); the timer circuit 25 is reset; and the overflow signal (Tm1Ovf) changes to L-level at a time point t29. When the signal level of the signal output from the data output terminal Q of the SR-FF 73 becomes L-level, the signal level of the reset input terminal R of the timer circuit 23 alternately repeats H-level and L-level correspondingly to the clock signal (Tm2Clock) and the timer circuit 32 is reset.

Although the N-MOSFET 23 is turned off and a back electromotive force is generated for the voltage VL1 and the voltage VL2 when the overflow signal (Tm1Ovf) becomes L-level at the time point t29, it is assumed that the edge detection circuits 61, 71 do not detect this change.

Figure 7:
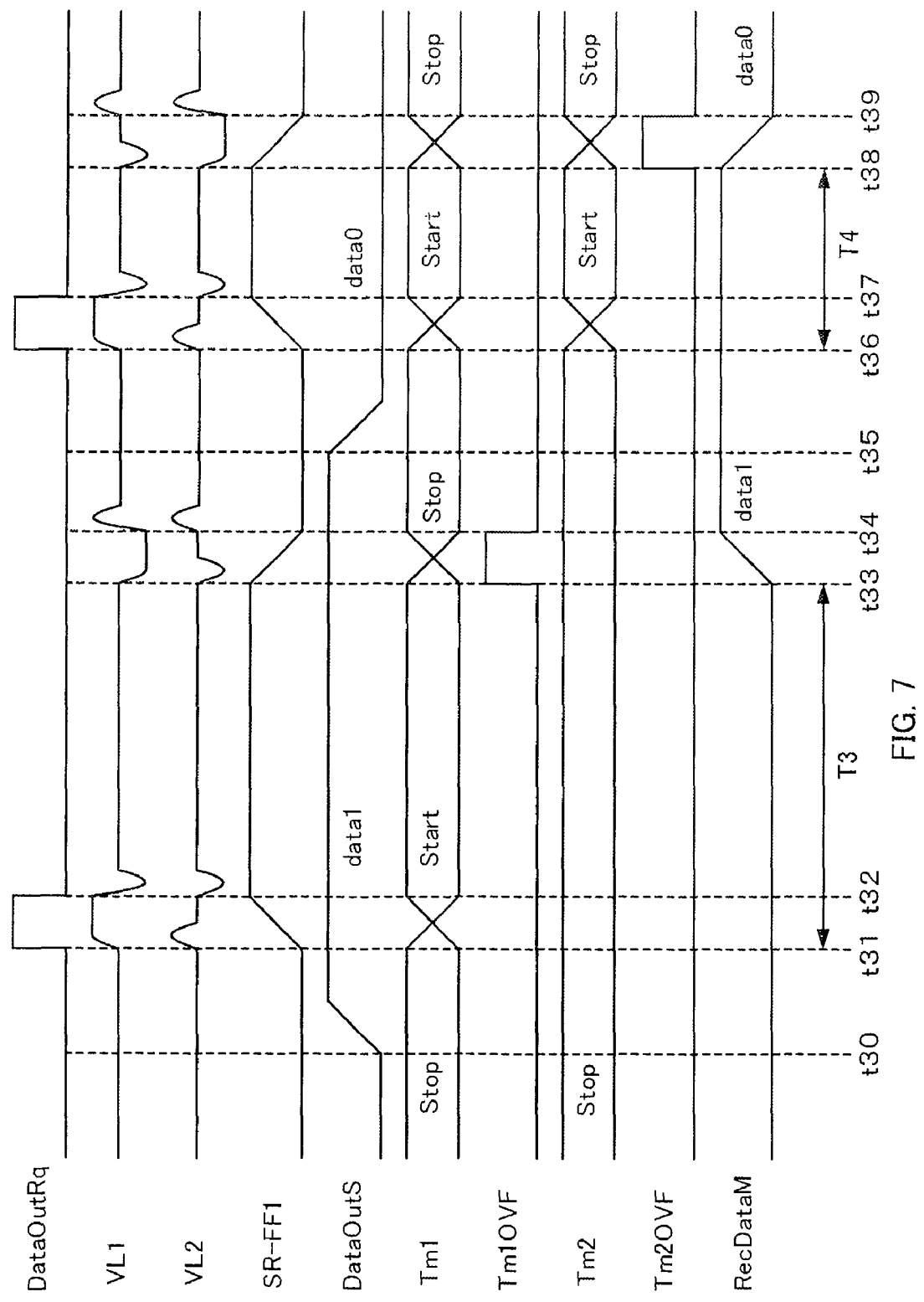
FIG. 7 depicts a timing chart when the master communication circuit receives data from the slave communication circuit through magnetic field coupling.

FIG. 7 depicts a timing chart when the master communication circuit 1 receives data from the slave communication circuit 2 through the magnetic field coupling. When the master communication circuit 1 receives data from the slave communication circuit 2, it is assumed that a relationship of T3>T4 is established between the time T3 detected by the timer circuit 25 of the master communication circuit 1 and the time T4 detected by the timer circuit 32 of the slave communication circuit 2.

First, at a time point t30, the transmission data signal (DataOutS) "1" is input from the control circuit 12. At a time point t31, the data output request signal (DataOutRq) output from the control circuit 11 becomes H-level. As a result, the P-MOSFET 21 is turned on; a current is applied from the P-MOSFET 21 toward the coil 60; and the voltage VL1 changes to H-level. A magnetic field is generated by applying a current to the coil 60 and is transmitted to the coil 70; a current is generated from the N-MOSFET 30 toward the coil 70; and the voltage VL2 changes to H-level. As a result, the signal output from the data output terminal Q of the SR-FF 63, 73 becomes H-level. Since the transmission/reception mode signal (SendRecM) is "0" in the master communication circuit 1, the output of the AND circuit 27 is L-level, and since the signal level of the signal output from the data output terminal Q of the SR-FF 63 is H-level, the output of the NOR circuit 26 is L-level, and the reset input terminal R of the timer circuit 25 changes to L-level. Therefore, the timer circuit 25 of the master communication circuit 1 starts the detecting operation for the time T3. On the other hand, in the slave communication circuit 2, Since the transmission data signal (DataOutS) is "1" and the transmission/reception mode signal (SendRecS) is "1", the output of the AND circuit 34 is H-level, and the reset input terminal R of the timer circuit 32 is maintained at H-level. Therefore, the timer circuit 32 of the slave communication circuit 2 does not start the counting operation.

Although the P-MOSFET 21 is turned off and a back electromotive force is generated for the voltage VL1 and the voltage VL2 when the data output request signal (DataOutRq) becomes L-level at a time point t32, it is assumed that the edge detection circuits 62, 72 do not detect this change. It is assumed that the data output request signal (DataOutRq) is maintained at H-level for a period shorter than T4.

At a time point t33 after the time T3 has elapsed from the time point t31, the overflow signal (Tm1Ovf) output from the timer circuit 25 of the master communication circuit 1 becomes H-level. As a result, the N-MOSFET 23 is turned on; a current is applied from the coil 60 toward the N-MOSFET 23; and the voltage VL1 changes to L-level. A magnetic field is generated by applying a current to the coil 60 and is transmitted to the coil 70; a current is generated from the coil 70 toward the N-MOSFET 30; and the voltage VL2 changes to L-level. As a result, the signal output from the data output terminal Q of the SR-FF 63, 73 becomes L-level. When the signal level of the signal output from the data output terminal Q of the SR-FF 63 becomes L-level, the signal input to the clock input terminal of the D-FF 29 is changed from L-level to H-level; the H-level overflow signal (Tm1Ovf) output from the timer circuit 25 is acquired by the D-FF 29; and the reception data signal (RecDataM) becomes H-level. That is, the master communication circuit 1 transmits "1" to the slave communication circuit 2.

When the signal level of the signal output from the data output terminal Q of the SR-FF 63 becomes L-level, the signal level of the reset input terminal R of the timer circuit 25 alternately repeats H-level and L-level correspondingly to the clock signal (Tm1Clock); the timer circuit 25 is reset; and the overflow signal (Tm1Ovf) changes to L-level at a time point t34.

Although the N-MOSFET 23 is turned off and a back electromotive force is generated for the voltage VL1 and the voltage VL2 when the overflow signal (Tm1Ovf) becomes L-level at the time point t34, it is assumed that the edge detection circuits 61, 71 do not detect this change.

When the transfer end signal (TransEndS) changes to L-level in accordance with the change in the signal level of the signal output from the data output terminal Q of the SR-FF 73, the control circuit 12 detects that the data transmission to the master communication circuit 1 is completed, and starts output of the next transmission data signal (DataOutS) "0" at a time point t35.

The data output request signal (DataOutRq) output from the control circuit 11 subsequently becomes H-level at a time point t36. As a result, the P-MOSFET 21 is turned on; a current is applied from the P-MOSFET 21 toward the coil 60; and the voltage VL1 changes to H-level. A magnetic field is generated by applying a current to the coil 60 and is transmitted to the coil 70; a current is generated from the N-MOSFET 30 toward the coil 70; and the voltage VL2 changes to H-level. Since the transmission/reception mode signal (SendRecS) is "0" in the master communication circuit 1, the output of the AND circuit 27 is L-level, and since the signal level of the signal output from the data output terminal Q of the SR-FF 63 is H-level, the output of the NOR circuit 26 is L-level, and the reset input terminal R of the timer circuit 25 changes to L-level. Therefore, the timer circuit 25 of the master communication circuit 1 starts the detecting operation for the time T3. In the slave communication circuit 2, since the transmission data signal (DataOutM) is "0", the output of the AND circuit 34 is L-level, and since the signal level of the signal output from the data output terminal Q of the SR-FF 73 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T4.

Although the P-MOSFET 21 is turned off and a back electromotive force is generated for the voltage VL1 and the voltage VL2 when the data output request signal (DataOutRq) becomes L-level at a time point t37, it is assumed that the edge detection circuits 62, 72 do not detect this change.

At a time point t38 after the time T4 has elapsed from the time point t36, the overflow signal (Tm2Ovf) output from the timer circuit 32 of the slave communication circuit 2 becomes H-level. Because of T3>T4, the overflow signal (Tm1Ovf) output from the timer circuit 25 of the master communication circuit 1 is maintained at L-level. As a result, the N-MOSFET 30 is turned on; a current is applied from the coil 70 toward the N-MOSFET 30; and the voltage VL2 changes to L-level. A magnetic field is generated by applying a current to the coil 70 and is transmitted to the coil 60; a current is generated from the coil 60 toward the N-MOSFET 23; and the voltage VL1 changes to L-level. As a result, the signal output from the data output terminal Q of the SR-FF 63, 73 becomes L-level. When the signal level of the signal output from the data output terminal Q of the SR-FF 63 becomes L-level, the signal input to the clock input terminal of the D-FF 29 is changed from L-level to H-level; the L-level overflow signal (Tm1Ovf) output from the timer circuit 25 is acquired by the D-FF 29; and the reception data signal (RecDataM) becomes L-level. That is, the master communication circuit 1 receives "0" from the slave communication circuit 2.

When the signal level of the signal output from the data output terminal Q of the SR-FF 63 becomes L-level, the signal level of the reset input terminal R of the timer circuit 25 alternately repeats H-level and L-level correspondingly to the clock signal (Tm1Clock) and the timer circuit 25 is reset. When the signal level of the signal output from the data output terminal Q of the SR-FF 73 becomes L-level, the signal level of the reset input terminal R of the timer circuit 32 alternately repeats H-level and L-level correspondingly to the clock signal (Tm2Clock); the timer circuit 32 is reset; and the overflow signal (Tm2Ovf) changes to L-level at a time point t39.

Although the N-MOSFET 30 is turned off and a back electromotive force is generated for the voltage VL1 and the voltage VL2 when the overflow signal (Tm2Ovf) becomes L-level at the time point t39, it is assumed that the edge detection circuits 61, 71 do not detect this change.

In this way, the data can be transmitted and received between the master communication circuit 1 and the slave communication circuit 2 through the wireless communication utilizing the magnetic field coupling of the coils 60 and 70.

(2) Electric Field Coupling

Figure 8:
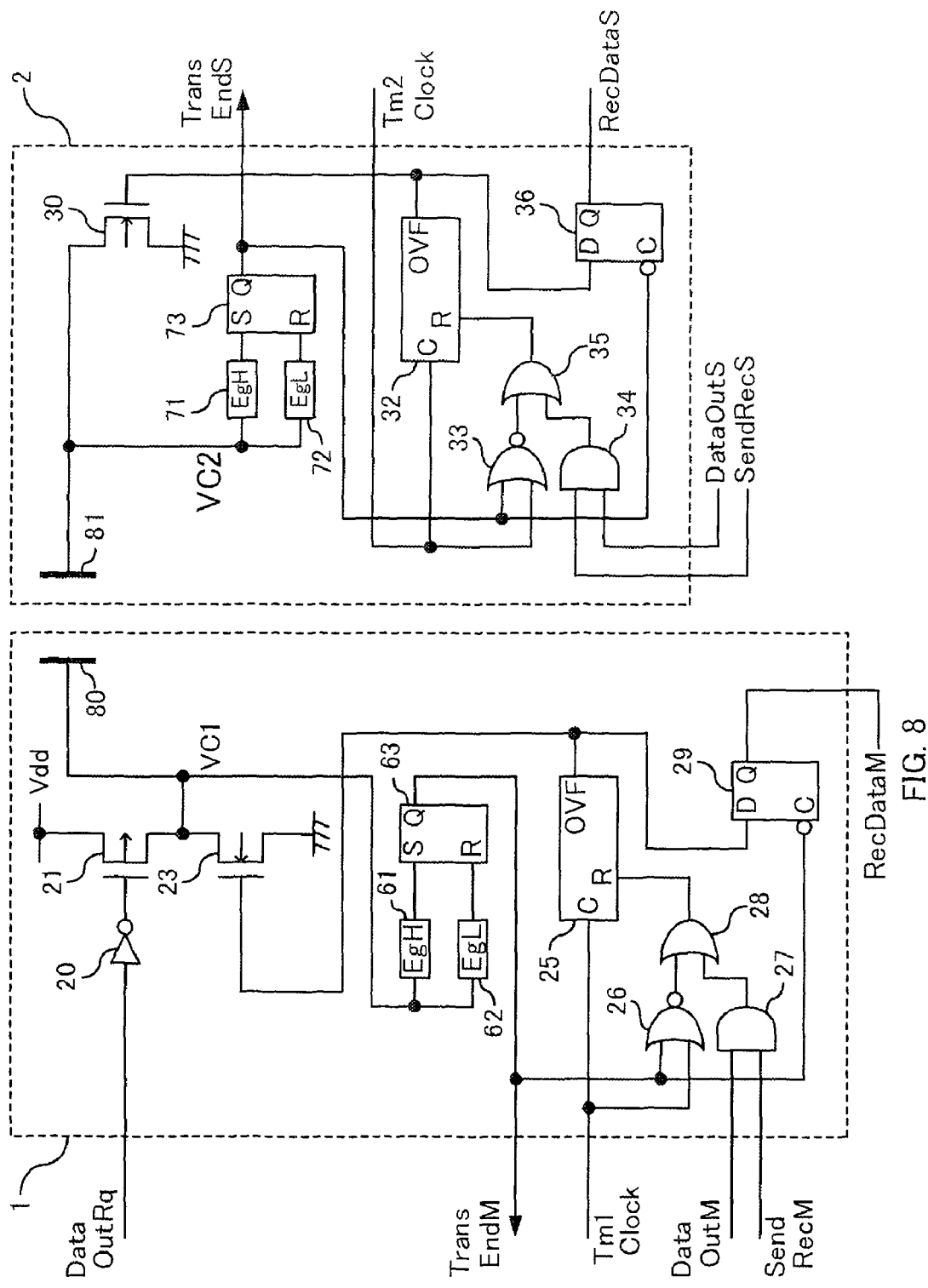
FIG. 8 depicts a configuration example of the master communication circuit and the slave communication circuit when wireless communication is performed through electric field coupling.

FIG. 8 depicts a configuration example of the master communication circuit 1 and the slave communication circuit 2 when the wireless communication is performed through the electric field coupling. As shown in FIG. 8, the master communication circuit 1 includes an electrode 80 (wireless communication circuit) instead of the coil 60 shown in FIG. 5. The slave communication circuit 2 includes an electrode 81 (wireless communication circuit) instead of the coil 70 shown in FIG. 5. While the master communication circuit 1 and the slave communication circuit 2 are in the vicinity of each other such that the electric field coupling can occur between the electrodes 80, 81, if the same procedure is performed as is the case with the magnetic field coupling, data can be transmitted and received between the master communication circuit 1 and the slave communication circuit 2.

Figure 9:
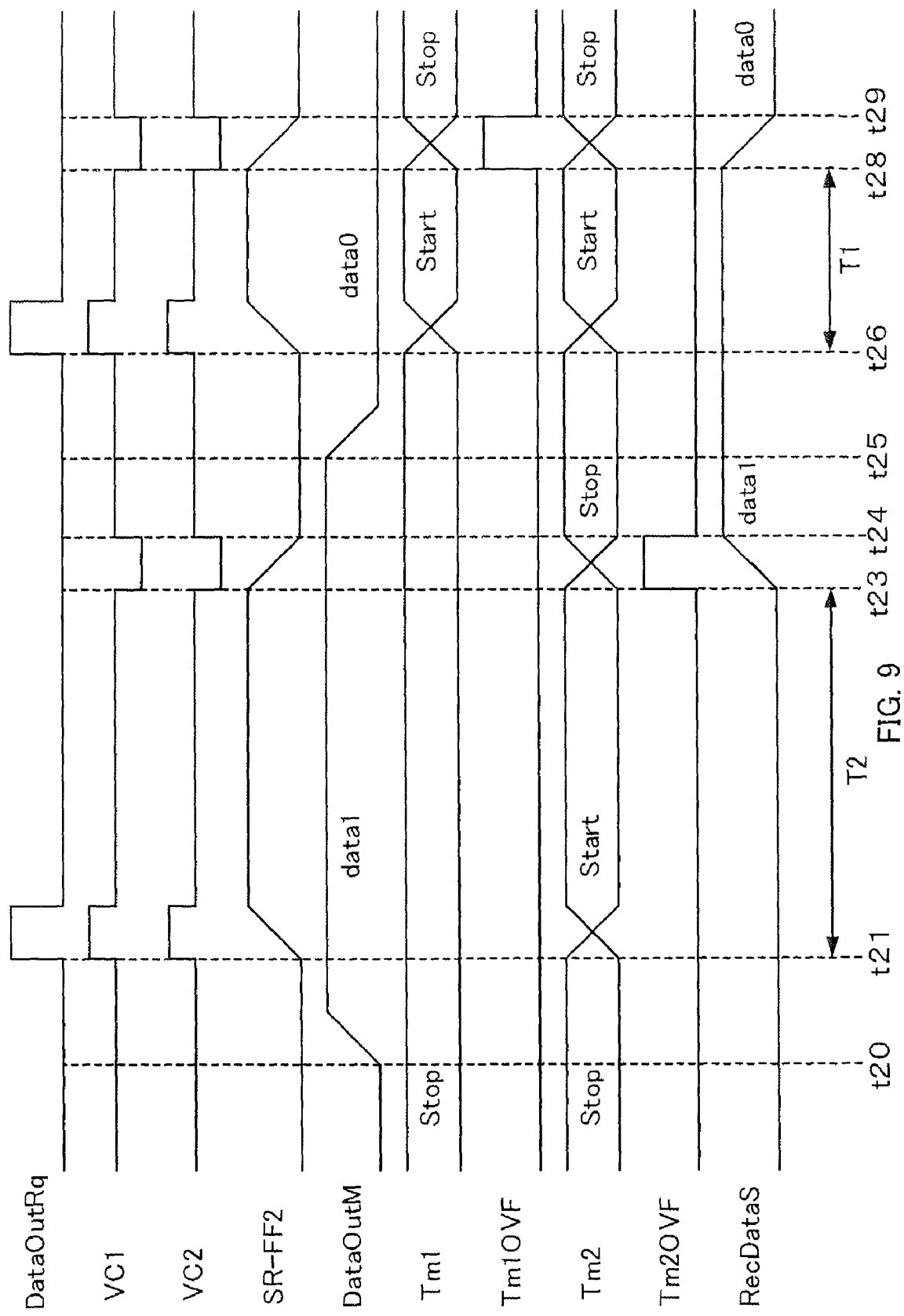
FIG. 9 depicts a timing chart when the master communication circuit transmits data to the slave communication circuit through electric field coupling.

FIG. 9 depicts a timing chart when the master communication circuit 1 transmits data to the slave communication circuit 2 through the electric field coupling. When the master communication circuit 1 transmits data to the slave communication circuit 2, it is assumed that a relationship of T1<T2 is established between the time T1 detected by the timer circuit 25 of the master communication circuit 1 and the time T2 detected by the timer circuit 32 of the slave communication circuit 2.

First, at the time point t20, the transmission data signal (DataOutM) "1" is input from the control circuit 11. At the time point t21, the data output request signal (DataOutRq) output from the control circuit 11 becomes H-level. As a result, the P-MOSFET 21 is turned on and a voltage VC1 of the electrode 80 changes to H-level. An electric field is generated because the voltage VC1 of the electrode 80 becomes H-level, and is transmitted to the electrode 81, and a voltage VC2 of the electrode 81 changes to H-level. As a result, the signal output from the data output terminal Q of the SR-FF 63, 73 becomes H-level. Since the transmission data signal (DataOutM) is "1" and the transmission/reception mode signal (SendRecM) is "1" in the master communication circuit 1, the output of the AND circuit 27 is H-level, and the reset input terminal R of the timer circuit 25 is maintained at H-level. Therefore, the timer circuit 25 of the master communication circuit 1 does not start the counting operation. On the other hand, in the slave communication circuit 2, since the transmission/reception mode signal (SendRecS) is "0", the output of the AND circuit 34 is L-level, and since the signal level of the signal output from the data output terminal Q is H-level, the output of the NOR circuit 33 becomes L-level, and the reset input terminal R of the timer circuit 32 changes to L-level. Therefore, the timer circuit 32 of the slave communication circuit 2 starts the detecting operation for the time T2. It is assumed that the data output request signal (DataOutRq) is maintained at H-level for a period shorter than T1.

At the time point t23 after the time T2 has elapsed from the time point t21, the overflow signal (Tm2Ovf) output from the timer circuit 32 of the slave communication circuit 2 becomes H-level. As a result, the N-MOSFET 30 is turned on and the voltage VC2 of the electrode 81 changes to L-level. An electric field is generated because the voltage VC2 of the electrode 81 becomes L-level, and is transmitted to the electrode 80, and the voltage VC1 of the electrode 80 changes to L-level. As a result, the signal output from the data output terminal Q of the SR-FF 63, 73 becomes L-level. When the signal level of the signal output from the data output terminal Q of the SR-FF 73 becomes L-level, the signal input to the clock input terminal of the D-FF 36 is changed from L-level to H-level; the H-level overflow signal (Tm2Ovf) output from the timer circuit 32 is acquired by the D-FF 36; and the reception data signal (RecDataS) becomes H-level. That is, the master communication circuit 1 transmits "1" to the slave communication circuit 2.

When the signal level of the signal output from the data output terminal Q of the SR-FF 73 becomes L-level, the signal level of the reset input terminal R of the timer circuit 32 alternately repeats H-level and L-level correspondingly to the clock signal (Tm2Clock); the timer circuit 32 is reset; and the overflow signal (Tm2Ovf) changes to L-level at the time point t24.

When the transfer end signal (TransEndM) changes to L-level in accordance with the change in the signal level of the signal output from the data output terminal Q of the SR-FF 63, the control circuit 11 detects that the data transmission to the slave communication circuit 2 is completed, and starts output of the next transmission data signal (DataOutM) "0" at the time point t25.

The data output request signal (DataOutRq) output from the control circuit 11 subsequently becomes H-level at the time point t26. As a result, the P-MOSFET 21 is turned on and the voltage VC1 of the electrode 80 changes to H-level. An electric field is generated because the voltage VC1 of the electrode 80 becomes H-level, and is transmitted to the electrode 81, and the voltage VC2 of the electrode 81 changes to H-level. As a result, the signal output from the data output terminal Q of the SR-FF 63, 73 becomes H-level. Since the transmission data signal (DataOutM) is "0" in the master communication circuit 1, the output of the AND circuit 27 is L-level, and since the signal level of the signal output from the data output terminal Q of the SR-FF 63 is H-level, the output of the NOR circuit 26 is L-level, and the reset input terminal R of the timer circuit 25 changes to L-level. Therefore, the timer circuit 25 of the master communication circuit 1 starts the detecting operation for the time T1. In the slave communication circuit 2, since the transmission/reception mode signal (SendRecS) is "0", the output of the AND circuit 34 is L-level, and since the signal level of the signal output from the data output terminal Q of the SR-FF 73 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T2.

At the time point t28 after the time T1 has elapsed from the time point t26, the overflow signal (Tm1Ovf) output from the timer circuit 25 of the master communication circuit 1 becomes H-level. Because of T1<T2, the overflow signal (Tm2Ovf) output from the timer circuit 32 of the slave communication circuit 2 is maintained at L-level. As a result, the N-MOSFET 23 is turned on and the voltage VC1 of the electrode 80 changes to L-level. An electric field is generated because the voltage VC1 of the electrode 80 becomes L-level, and is transmitted to the electrode 81, and the voltage VC2 of the electrode 81 changes to L-level. As a result, the signal output from the data output terminal Q of the SR-FF 63, 73 becomes L-level. When the signal level of the signal output from the data output terminal Q of the SR-FF 73 becomes L-level, the signal input to the clock input terminal of the D-FF 36 is changed from L-level to H-level; the L-level overflow signal (Tm2Ovf) output from the timer circuit 32 is acquired by the D-FF 36; and the reception data signal (RecDataS) becomes L-level. That is, the master communication circuit 1 transmits "0" to the slave communication circuit 2.

When the signal level of the signal output from the data output terminal Q of the SR-FF 63 becomes L-level, the signal level of the reset input terminal R of the timer circuit 25 alternately repeats H-level and L-level correspondingly to the clock signal (Tm1Clock); the timer circuit 25 is reset; and the overflow signal (Tm1Ovf) changes to L-level at the time point t29. When the signal level of the signal output from the data output terminal Q of the SR-FF 73 becomes L-level, the signal level of the reset input terminal R of the timer circuit 23 alternately repeats H-level and L-level correspondingly to the clock signal (Tm2Clock) and the timer circuit 32 is reset.

Figure 10:
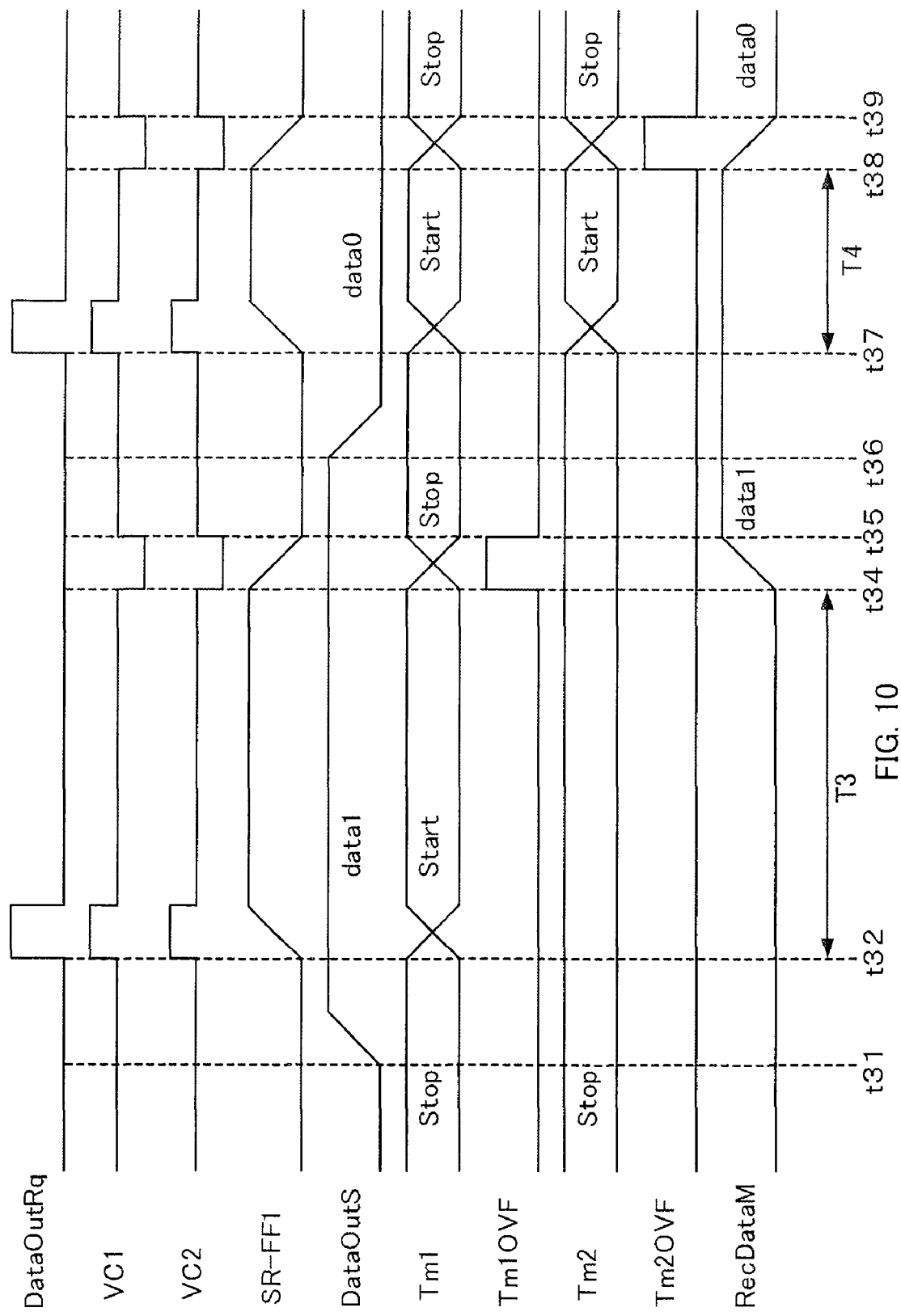
FIG. 10 depicts a timing chart when the master communication circuit receives data from the slave communication circuit through electric field coupling.

FIG. 10 depicts a timing chart when the master communication circuit 1 receives data from the slave communication circuit 2 through the electric field coupling. When the master communication circuit 1 receives data from the slave communication circuit 2, it is assumed that a relationship of T3>T4 is established between the time T3 detected by the timer circuit 25 of the master communication circuit 1 and the time T4 detected by the timer circuit 32 of the slave communication circuit 2.

First, at a time point t31, the transmission data signal (DataOutS) "1" is input from the control circuit 12. At a time point t32, the data output request signal (DataOutRq) output from the control circuit 11 becomes H-level. As a result, the P-MOSFET 21 is turned on and the voltage VC1 of the electrode 80 changes to H-level. An electric field is generated because the voltage VC1 of the electrode 80 becomes H-level, and is transmitted to the electrode 81, and the voltage VC2 of the electrode 81 changes to H-level. As a result, the signal output from the data output terminal Q of the SR-FF 63, 73 becomes H-level. Since the transmission/reception mode signal (SendRecM) is "0" in the master communication circuit 1, the output of the AND circuit 27 is L-level, and since the signal level of the signal output from the data output terminal Q of the SR-FF 63 is H-level, the output of the NOR circuit 26 is L-level, and the reset input terminal R of the timer circuit 25 changes to L-level. Therefore, the timer circuit 25 of the master communication circuit 1 starts the detecting operation for the time T3. On the other hand, in the slave communication circuit 2, Since the transmission data signal (DataOutS) is "1" and the transmission/reception mode signal (SendRecS) is "1", the output of the AND circuit 34 is H-level, and the reset input terminal R of the timer circuit 32 is maintained at H-level. Therefore, the timer circuit 32 of the slave communication circuit 2 does not start the counting operation. It is assumed that the data output request signal (DataOutRq) is maintained at H-level for a period shorter than T4.

At the time point t34 after the time T3 has elapsed from the time point t32, the overflow signal (Tm1Ovf) output from the timer circuit 25 of the master communication circuit 1 becomes H-level. As a result, the N-MOSFET 23 is turned on and the voltage VC1 of the electrode 80 changes to L-level. An electric field is generated because the voltage VC1 of the electrode 80 becomes L-level, and is transmitted to the electrode 81, and the voltage VC2 of the electrode 81 changes to L-level. As a result, the signal output from the data output terminal Q of the SR-FF 63, 73 becomes L-level. When the signal level of the signal output from the data output terminal Q of the SR-FF 63 becomes L-level, the signal input to the clock input terminal of the D-FF 29 is changed from L-level to H-level; the H-level overflow signal (Tm1Ovf) output from the timer circuit 25 is acquired by the D-FF 29; and the reception data signal (RecDataM) becomes H-level. That is, the master communication circuit 1 transmits "1" to the slave communication circuit 2.

When the signal level of the signal output from the data output terminal Q of the SR-FF 63 becomes L-level, the signal level of the reset input terminal R of the timer circuit 25 alternately repeats H-level and L-level correspondingly to the clock signal (Tm1Clock); the timer circuit 25 is reset; and the overflow signal (Tm1Ovf) changes to L-level at the time point t35.

When the transfer end signal (TransEndS) changes to L-level in accordance with the change in the signal level of the signal output from the data output terminal Q of the SR-FF 73, the control circuit 12 detects that the data transmission to the master communication circuit 1 is completed, and starts output of the next transmission data signal (DataOutS) "0" at the time point t36.

The data output request signal (DataOutRq) output from the control circuit 11 subsequently becomes H-level at the time point t37. As a result, the P-MOSFET 21 is turned on and the voltage VC1 of the electrode 80 changes to H-level. An electric field is generated because the voltage VC1 of the electrode 80 becomes H-level, and is transmitted to the electrode 81, and the voltage VC2 of the electrode 81 changes to H-level. Since the transmission/reception mode signal (SendRecS) is "0" in the master communication circuit 1, the output of the AND circuit 27 is L-level, and since the signal level of the signal output from the data output terminal Q of the SR-FF 63 is H-level, the output of the NOR circuit 26 is L-level, and the reset input terminal R of the timer circuit 25 changes to L-level. Therefore, the timer circuit 25 of the master communication circuit 1 starts the detecting operation for the time T3. In the slave communication circuit 2, since the transmission data signal (DataOutM) is "0", the output of the AND circuit 34 is L-level, and since the signal level of the signal output from the data output terminal Q of the SR-FF 73 is H-level, the output of the NOR circuit 33 becomes L-level, and the reset input terminal R of the timer circuit 32 changes to L-level. Therefore, the timer circuit 32 of the slave communication circuit 2 starts the detecting operation for the time T4.

At the time point t38 after the time T4 has elapsed from the time point t37, the overflow signal (Tm2Ovf) output from the timer circuit 32 of the slave communication circuit 2 becomes H-level. Because of T3>T4, the overflow signal (Tm1Ovf) output from the timer circuit 25 of the master communication circuit 1 is maintained at L-level. As a result, the N-MOSFET 30 is turned on and the voltage VC2 of the electrode 81 changes to L-level. An electric field is generated because the voltage VC2 of the electrode 81 becomes L-level, and is transmitted to the electrode 80, and the voltage VC1 of the electrode 80 changes to L-level. As a result, the signal output from the data output terminal Q of the SR-FF 63, 73 becomes L-level. When the signal level of the signal output from the data output terminal Q of the SR-FF 63 becomes L-level, the signal input to the clock input terminal of the D-FF 29 is changed from L-level to H-level; the L-level overflow signal (Tm1Ovf) output from the timer circuit 25 is acquired by the D-FF 29; and the reception data signal (RecDataM) becomes L-level. That is, the master communication circuit 1 receives "0" from the slave communication circuit 2.

When the signal level of the signal output from the data output terminal Q of the SR-FF 63 becomes L-level, the signal level of the reset input terminal R of the timer circuit 25 alternately repeats H-level and L-level correspondingly to the clock signal (Tm1Clock) and the timer circuit 25 is reset.

When the signal level of the signal output from the data output terminal Q of the SR-FF 73 becomes L-level, the signal level of the reset input terminal R of the timer circuit 32 alternately repeats H-level and L-level correspondingly to the clock signal (Tm2Clock); the timer circuit 32 is reset; and the overflow signal (Tm2Ovf) changes to L-level at the time point t39.

In this way, the data can be transmitted and received between the master communication circuit 1 and the slave communication circuit 2 through the wireless communication utilizing the electric field coupling of the electrodes 80 and 81.

The master communication circuit 1 and the slave communication circuit 2 of the embodiment have been described. When the master communication circuit 1 transmits data to the slave communication circuit 2, by establishing the relationship of T1<T2 between the time T1 detected by the timer circuit 25 of the master communication circuit 1 and the time T2 detected by the timer circuit 32 of the slave communication circuit 2, the data of "1" or "0" can be transmitted in accordance with whether the detecting operation is started in the timer circuit 25 of the master communication circuit 1 as above. Therefore, the master communication circuit 1 and the slave communication circuit 2 do not have to operate at the highly accurately controlled common timing. That is, the master communication circuit 1 can correctly transmit data to the slave communication circuit 2 even if the accuracy of the clock is low which is used by the master communication circuit 1 and the slave communication circuit 2 for the counting operation. Since only one piece of data is transmitted/received at one time between the master communication circuit 1 and the slave communication circuit 2, the number of the terminal necessary for the communication can be at most one.

In the case of the wired communication, the master communication circuit 1 and the slave communication circuit 2 may be connected through the one communication line 10. Therefore, if an integrated circuit is formed, only one terminal is necessary for communication and the chip size can be reduced.

If the master communication circuit 1 and the slave communication circuit 2 include the holding circuit 13, no holding circuit 13 is needed to be disposed on the communication line 10, and the master communication circuit 1 and the slave communication circuit 2 can easily be connected. If the slave communication circuit 2 is built into the integrated circuit equipped with the microcomputer to be debugged, the chip size of the integrated circuit can be reduced by including the holding circuit 13 on the communication line 10 or within the master communication circuit 1.

In the embodiment, the timer circuits 25, 32 are reset at the timing when the signal level of the communication line 10 changes to L-level. That is, when transmission of one piece of data is completed from the master communication circuit 1 to the slave communication circuit 2, the timer circuits 25, 32 are reset. Therefore, the control circuits 11, 12 do not have to reset the timer circuits 25, 32 when the next data is transmitted. When the master communication circuit 1 transmits a plurality of pieces of data to the slave communication circuit 2, since the timer circuits 25, 32 are reset each time one piece of data is transmitted, the deviation in time is not accumulated and the data can correctly be transmitted even if the accuracy of the clock used for the counting operation is low.

The master communication circuit 1 can wirelessly transmit data to the slave communication circuit 2. In this case, the communication line 10 and the input/output terminals 24, 31 are not needed. Therefore, for example, if the slave communication circuit 2 is built into the integrated circuit equipped with the microcomputer to be debugged, the chip size of the integrated circuit can be reduced since the input/output terminal 31 is not needed.

When master communication circuit 1 wirelessly transmits data to the slave communication circuit 2, the timer circuits 25, 32 are reset at the timing when the signal level of the signal output from the data output terminal Q of the SR-FF 63, 73 changes to L-level. That is, when transmission of one piece of data is completed from the master communication circuit 1 to the slave communication circuit 2, the timer circuits 25, 32 are reset. Therefore, the control circuits 11, 12 do not have to reset the timer circuits 25, 32 when the next data is transmitted. When the master communication circuit 1 transmits a plurality of pieces of data to the slave communication circuit 2, since the timer circuits 25, 32 are reset each time one piece of data is transmitted, the deviation in time is not accumulated and the data can correctly be transmitted even if the accuracy of the clock used for the counting operation is low.

When the master communication circuit 1 receives data from the slave communication circuit 2, by establishing the relationship of T3>T4 between the time T3 detected by the timer circuit 25 of the master communication circuit 1 and the time T4 detected by the timer circuit 32 of the slave communication circuit 2, the data of "1" or "0" can be received in accordance with whether the detecting operation is started in the timer circuit 32 of the slave communication circuit 2. Therefore, the master communication circuit 1 and the slave communication circuit 2 do not have to operate at the highly accurately controlled common timing. That is, the master communication circuit 1 can correctly receive data from the slave communication circuit 2 even if the accuracy of the clock is low which is used by the master communication circuit 1 and the slave communication circuit 2 for the counting operation. Since only one piece of data is transmitted/received at one time between the master communication circuit 1 and the slave communication circuit 2, the number of the terminal necessary for the communication can be at most one. In the case of the wired communication, the master communication circuit 1 and the slave communication circuit 2 may be connected through the one communication line 10. Therefore, if an integrated circuit is formed, only one terminal is necessary for communication and the chip size can be reduced.

When the master communication circuit 1 receives data from the slave communication circuit 2, if the master communication circuit 1 and the slave communication circuit 2 include the holding circuit 13, no holding circuit 13 is needed to be disposed on the communication line 10, and the master communication circuit 1 and the slave communication circuit 2 can easily be connected. If the slave communication circuit 2 is built into the integrated circuit equipped with the microcomputer to be debugged, the chip size of the integrated circuit can be reduced by including the holding circuit 13 on the communication line 10 or within the master communication circuit 1.

When the master communication circuit 1 receives data from the slave communication circuit 2, the timer circuits 25, 32 are also reset at the timing when the signal level of the communication line 10 changes to L-level. That is, when transmission of one piece of data is completed from the slave communication circuit 2 to the master communication circuit 1, the timer circuits 25, 32 are reset. Therefore, the control circuits 11, 12 do not have to reset the timer circuits 25, 32 when the next data is transmitted. When the master communication circuit 1 receives a plurality of pieces of data from the slave communication circuit 2, since the timer circuits 25, 32 are reset each time one piece of data is received, the deviation in time is not accumulated and the data can correctly be transmitted even if the accuracy of the clock used for the counting operation is low.

The master communication circuit 1 can wirelessly receive data from the slave communication circuit 2. In this case, the communication line 10 and the input/output terminals 24, 31 are not needed. Therefore, for example, if the slave communication circuit 2 is built into the integrated circuit equipped with the microcomputer to be debugged, the chip size of the integrated circuit can be reduced since the input/output terminal 31 is not needed.

When master communication circuit 1 wirelessly receives data from the slave communication circuit 2, the timer circuits 25, 32 are reset at the timing when the signal level of the signal output from the data output terminal Q of the SR-FF 63, 73 changes to L-level. That is, when transmission of one piece of data is completed from the slave communication circuit 2 to the master communication circuit 1, the timer circuits 25, 32 are reset. Therefore, the control circuits 11, 12 do not have to reset the timer circuits 25, 32 when the next data is transmitted. When the master communication circuit 1 receives a plurality of pieces of data from the slave communication circuit 2, since the timer circuits 25, 32 are reset each time one piece of data is received, the deviation in time is not accumulated and the data can correctly be transmitted even if the accuracy of the clock used for the counting operation is low.

The master communication circuit 1 and the slave communication circuit 2 can be switched to the transmission operation or the reception operation in accordance with the transmission/reception mode signal. That is, the master communication circuit 1 and the slave communication circuit 2 can be used for performing the two-way communication.

The above description is merely for the purpose of facilitating the understanding of the present invention and is not intended to limit the interpretation of the present invention. The present invention may variously be changed/altered without departing from the spirit thereof and encompasses the equivalents thereof.

It is claimed:

1. A master communication circuit communicatively connected to a slave communication circuit, comprising:
    a first output circuit that outputs a first output signal of one logical level to initiate transmission of either a first logical value or a second logical value from the master communication circuit to the slave communication circuit;
    a timer circuit that can detect a first time, the timer circuit starting a detecting operation of the first time when the first output signal is output to initiate transmission of the first logical value from the master communication circuit to the slave communication circuit;
    a second output circuit that outputs a second output signal of another logical level when the timer circuit detects the first time, wherein
        the output of the first output signal instructs the slave communication circuit to start a detecting operation of a second time longer than the first time, and wherein
        the slave communication circuit receives the first logical value if the slave communication circuit does not detect the second time before the second output circuit outputs the second output signal, and wherein
        the slave communication circuit receives the second logical value if the slave communication circuit detects the second time.

2. The master communication circuit of claim 1, the circuit being connectable to the slave communication circuit through one communication line that can hold a level of a signal output thereto, wherein
    the first output circuit outputs the first output signal to the communication line so that the slave communication circuit starts the detecting operation of the second time, and wherein
    the second output circuit outputs the second output signal to the communication line when the timer circuit detects the first time.

3. The master communication circuit of claim 2, wherein
    the timer circuit is reset when the signal level of the communication line is changed from the one logical level to the other logical level.

4. The master communication circuit of claim 1, the circuit being connectable to the slave communication circuit through one communication line, further comprising:
    a holding circuit that can hold the signal level of the communication line at a level of a signal when the signal is output to the communication line, wherein
    the first output circuit outputs the first output signal to the communication line so that the slave communication circuit starts the detecting operation of the second time, and wherein
    the second output circuit outputs the second output signal to the communication line when the timer circuit detects the first time.

5. The master communication circuit of claim 1, further comprising:
    a wireless communication circuit that wirelessly transmits the first output signal output from the first output circuit or the second output signal output from the second output circuit to the slave communication circuit.

6. A slave communication circuit communicatively connected to a master communication circuit that can detect a first time, comprising:
    a timer circuit that starts a detecting operation of a second time longer than the first time in accordance with a first output signal of one logical level transmitted from the master communication circuit; and
    a reception circuit that outputs a first logical value if the timer circuit does not detect the second time and a second output signal of another logical level is transmitted from the master communication circuit since the master communication circuit detects the first time, the reception circuit outputting a second logical value if the timer circuit detects the second time.

7. The slave communication circuit of claim 6, the circuit being connectable to the master communication circuit through one communication line that can hold a level of an signal output thereto, further comprising:
    an output circuit that outputs the second output signal to the communication line when the timer circuit detects the second time, wherein
    when the signal level of the communication line is changed from the one logical level to the other logical level, the reception circuit outputs the first logical value if the timer circuit does not detect the second time and outputs the second logical value if the timer circuit detects the second time.

8. The slave communication circuit of claim 7, wherein
    the timer circuit is reset when the signal level of the communication line is changed from the one logical level to the other logical level.

9. The slave communication circuit of claim 6, the circuit being connectable to the master communication circuit through one communication line, further comprising:
- a holding circuit that can hold the signal level of the communication line at a level of a signal when the signal is output to the communication line; and
- an output circuit that outputs the second output signal to the communication line when the timer circuit detects the second time, wherein
- when the signal level of the communication line is changed from the one logical level to the other logical level, the reception circuit outputs the first logical value if the timer circuit does not detect the second time and outputs the second logical value if the timer circuit detects the second time.

10. The slave communication circuit of claim 6, further comprising:
- an output circuit that outputs the second output signal when the timer circuit detects the second time;
- a wireless communication circuit that receives the first or second output signal transmitted wirelessly from the master communication circuit; and
- a memory circuit that stores the signal level of the signal transmitted from the master communication circuit or the signal output from the output circuit, wherein
- when the signal level stored in the memory circuit is changed from the one logical level to the other logical level, the reception circuit outputs the first logical value if the timer circuit does not detect the second time and outputs the second logical value if the timer circuit detects the second time.

11. The slave communication circuit of claim 10, wherein the wireless communication circuit is configured by a coil that detects the first or second output signal transmitted from the master communication circuit through a change in a magnetic field.

12. The slave communication circuit of claim 11, wherein the coil generates a magnetic field in accordance with the second output signal output from the output circuit to reset the detecting operation of the first time in the master communication circuit, and wherein
the timer circuit is reset when the signal level stored in the memory circuit is changed from the one logical level to the other logical level.

13. The slave communication circuit of claim 10, wherein the wireless communication circuit is configured by an electrode that detects the first or second output signal transmitted from the master communication circuit through a change in an electric field.

14. The slave communication circuit of claim 13, wherein the electrode generates an electric field in accordance with the second output signal output from the output circuit to reset the detecting operation of the first time in the master communication circuit, and wherein
the timer circuit is reset when the signal level stored in the memory circuit is changed from the one logical level to the other logical level.

15. The slave communication circuit of claim 10, wherein the wireless communication circuit transmits the second output signal output from the output circuit to the master communication circuit to reset the detecting operation of the first time in the master communication circuit, and wherein
the timer circuit is reset when the signal level stored in the memory circuit is changed from the one logical level to the other logical level.

16. A slave communication circuit communicatively connected to a master communication circuit that can detect a first time, comprising:
- a timer circuit that starts a detecting operation of a second time shorter than the first time in accordance with a first output signal of one logical level transmitted from the master communication circuit when a first logical value is transmitted to the master communication circuit; and
- an output circuit that outputs a second output signal of another logical level when the timer circuit detects the second time, wherein
- the master communication circuit receives the first logical value if the master communication circuit does not detect the first time and the output circuit outputs the second output signal to the master communication circuit, and wherein
- the master communication circuit receives a second logical value if the master communication circuit detects the first time.

17. The slave communication circuit of claim 16, the circuit being connectable to the master communication circuit through one communication line that can hold a level of an output signal, wherein
the output circuit outputs the second output signal to the communication line when the timer circuit detects the second time.

18. The slave communication circuit of claim 17, wherein the timer circuit is reset when the signal level of the communication line is changed from the one logical level to the other logical level since the output circuit outputs the second output signal to the communication line or the master communication circuit detects the first time and outputs the second output signal to the communication line.

19. The slave communication circuit of claim 16, the circuit being connectable to the master communication circuit through one communication line, further comprising:
- a holding circuit that can hold the signal level of the communication line at a level of a signal when the signal is output to the communication line, wherein
- the output circuit outputs the second output signal to the communication line when the timer circuit detects the second time.

20. The slave communication circuit of claim 16, further comprising:
- a wireless communication circuit that receives the first output signal transmitted wirelessly from the master communication circuit or wirelessly transmits the second output signal output from the output circuit.

* * * * *